United States Patent
Endo

(10) Patent No.: US 7,046,399 B2
(45) Date of Patent: May 16, 2006

(54) METHOD AND SYSTEM FOR REMOVING ISOLATED PIXEL PORTIONS IN IMAGE

(75) Inventor: Takayuki Endo, Kanagawa (JP)

(73) Assignee: Ricoh Company, LTD, Tokyo (JP)

( * ) Notice: Subject to any disclaimer, the term of this patent is extended or adjusted under 35 U.S.C. 154(b) by 1025 days.

(21) Appl. No.: 10/026,050

(22) Filed: Dec. 21, 2001

(65) Prior Publication Data

US 2002/0101618 A1 Aug. 1, 2002

(30) Foreign Application Priority Data

Dec. 25, 2000 (JP) ............................ 2000-393819
Feb. 23, 2001 (JP) ............................ 2001-049084
Dec. 7, 2001 (JP) ............................ 2001-374873

(51) Int. Cl.
*H04N 1/409* (2006.01)
*G06T 5/00* (2006.01)

(52) U.S. Cl. ...................... 358/3.26; 382/275

(58) Field of Classification Search ................ 358/1.9, 358/3.26, 3.27, 463; 382/254, 275, 260, 382/261, 264, 266, 199, 205
See application file for complete search history.

(56) References Cited

U.S. PATENT DOCUMENTS 4,389,677 A * 6/1983 Rushby et al. .............. 358/463
6,208,763 B1 * 3/2001 Avinash ...................... 382/254

* cited by examiner

*Primary Examiner*—Scott A. Rogers
(74) *Attorney, Agent, or Firm*—Knoble Yoshida Dunleavy, LLC

(57) ABSTRACT

Isolated pixel portions are removed from an image based upon a minimum of a two-step detection process. A first step is to compare the parallel edges of a predetermined unit area to a predetermined first threshold value so as to detect a possible line or continuous image in the predetermined area in a first direction. A second step is to ascertain that another line or continuous image exists in a second direction which is perpendicular to the first direction by comparing the average pixel values from lines of pixels in the second direction. Based upon the two comparison results, it is determined whether or not an isolated portion exists in the predetermined unit area.

33 Claims, 27 Drawing Sheets

RECTANGULAR BLOCK

\* CURRENT PIXEL

■ COMPARING TO THRESH1

1st ROW
2nd ROW
3rd ROW
4th ROW
5th ROW
6th ROW

RECTANGULAR BLOCK

[*] CURRENT PIXEL

[▨] COMPARING TO THRESH1

RECTANGULAR BLOCK

[*] CURRENT PIXEL

[▨] LINE AVERAGE PIXEL

[■] COMPARING TO THRESH1

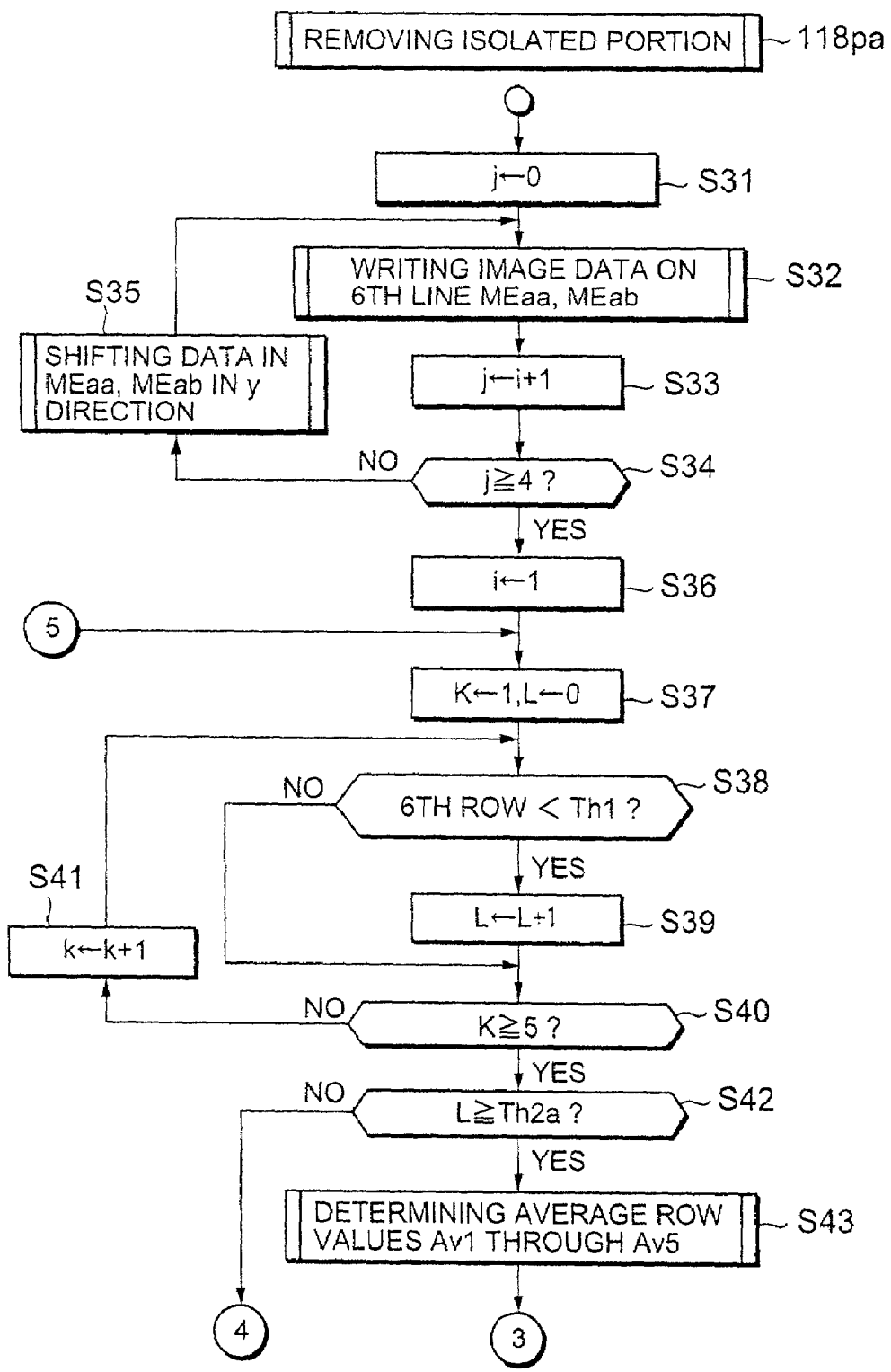

METHOD AND SYSTEM FOR REMOVING ISOLATED PIXEL PORTIONS IN IMAGE

FIELD OF THE INVENTION

The current invention is generally related to a method of and a system for image processing, and more particularly related to method of and a system for removing noise or undesirable portions from a digital image.

BACKGROUND OF THE INVENTION

In general, undesirable noise such as isolated pixel data exists in an image that has been scanned in by a copier or a facsimile machine. To remove the noise by an image process such as a digital filtering process, the quality of an image is generally reduced. Japanese Patent Publication Hei 10-93824 discloses one example of the detection and correction of the isolated pixels based upon a preprocessing by a MTF filter for edge emphasis, a process using a number of pixels having a predetermined range of intensity and a reference table as well as a process of correcting only a current pixel. The above technology requires the reference table that must be prepared in advance. Furthermore, since the table referencing and the matrix calculation in the preprocessing by a filter consume a large amount of processing time, the processing speed has not improved.

To accomplish the above and other prior art image processing, a processor called a single program multiple data (SIMD) has been utilized. Since a SIMD processor carries our the same instruction on multiple data sets during a single cycle, the SIMD processor significantly improves efficiency of a certain process. While FIG. 1 illustrates how the SIMD processor processes the multiple data, FIG. 2 illustrates a conventional processor processes the same data in the same manner. In FIGS. 1 and 2, the both processors multiply the multiple data by two (×2) or shift the data to the left by one bit. The SIMD processor outputs the results from the multiple data in a single cycle. On the other hand, since the conventional processor processes one piece of input data at a time during a single cycle, it must require eight cycles to process the entire data.

For the image processing for removing undesirable pixels, the SIMD processor still requires operations that are similar to the conventional processor for sequential tasks. For the above reason, the isolated pixel removal cannot take advantage of the SIMD processor.

Furthermore, the prior art techniques generally remove an isolated portion only from the currently processed pixel position. Since the isolated portion usually includes a plurality of pixels, the above prior art techniques fail to provide an effective image correction. It is desired that the isolated portions be removed in a cluster including pixels surrounding the current pixel rather the current pixel alone as shown in FIG. 3.

SUMMARY OF THE INVENTION

In order to solve the above and other problems, according to a first aspect of the current invention, a method of detecting isolated pixels in a predetermined unit area, including the steps of: comparing pixel values in a first pair of parallel edges in a first direction in the predetermined unit area to a first predetermined threshold value to generate a first comparison result; determining an average pixel value for a group of pixels in a second direction in the predetermined unit area, the second direction being perpendicular to the first direction, the group of pixels including outer lines and inner lines; selecting a larger one of the average pixel values from the outer lines, the selected outer average pixel value being defined as Th; selecting a largest one of the average pixel values from the inner lines, the selected inner average pixel value being defined as Max; comparing (Mx−Th) to a predetermined second threshold value to generate a second comparison result; and detecting an isolated portion in the predetermined unit area based upon the first comparison result and the second comparison result.

According to a second aspect of the current invention, a system for detecting isolated pixels in a predetermined unit area, including: an input unit for inputting pixel values of the predetermined unit area; a pixel value averaging unit for determining an average pixel value for a group of pixels in a second direction in the predetermined unit area, the second direction being perpendicular to the first direction, the group of pixels including outer lines and inner lines, the comparing unit selecting a larger one of the average pixel values from the outer lines; a comparing unit connected to the input unit for comparing the pixel values in a first pair of parallel edges in a first direction in the predetermined unit area to a first predetermined threshold value to generate a first comparison result; the selected outer average pixel value being defined as Th and selecting a largest one of the average pixel values from the inner lines, the selected inner average pixel value being defined as Max, the comparing unit comparing (Mx−Th) to a predetermined second threshold value to generate a second comparison result; and an isolated portion detecting unit connected to the comparing unit for detecting an isolated portion in the predetermined unit area based upon the first comparison result and the second comparison result.

According to a third aspect of the current invention, a software storage medium for storing a computer readable program containing computer instructions for detecting isolated pixels in a predetermined unit area, the computer instructions performing the tasks of: comparing pixel values in a first pair of parallel edges in a first direction in the predetermined unit area to a first predetermined threshold value to generate a first comparison result; determining an average pixel value for a group of pixels in a second direction in the predetermined unit area, the second direction being perpendicular to the first direction, the group of pixels including outer lines and inner lines; selecting a larger one of the average pixel values from the outer lines, the selected outer average pixel value being defined as Th; selecting a largest one of the average pixel values from the inner lines, the selected inner average pixel value being defined as Max; comparing (Mx−Th) to a predetermined second threshold value to generate a second comparison result; and detecting an isolated portion in the predetermined unit area based upon the first comparison result and the second comparison result.

According to a fourth aspect of the current invention, a method of detecting isolated pixels in a predetermined unit area, including the steps of: comparing pixel values in a first pair of parallel edges in a first direction in the predetermined unit area to a first predetermined threshold value to generate a first comparison result; comparing pixel values in a second pair of parallel edges in a second direction in the predetermined unit area to the first predetermined threshold value to generate a third comparison result; determining an average pixel value for a group of pixels in a second direction in the predetermined unit area, the second direction being perpendicular to the first direction, the group of pixels including outer lines and inner lines; selecting a larger one of the average pixel values from the outer lines, the selected outer average pixel value being defined as Th; selecting a largest one of the average pixel values from the inner lines, the selected inner average pixel value being defined as Max; comparing (Mx–Th) to a predetermined second threshold value to generate a second comparison result; and detecting an isolated portion in the predetermined unit area based upon the first comparison result, the second comparison result and the third comparison result.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIGS. 31 and 32 are a flow chart illustrating steps involved in a second preferred process of removing isolated portions from image data according to the current invention.

DETAILED DESCRIPTION OF THE PREFERRED EMBODIMENT(S)

Figure 1:
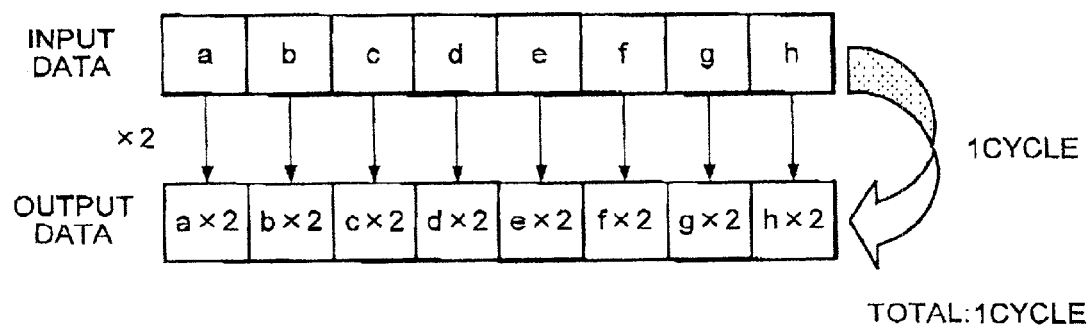
FIG. 1 is a diagram illustrating as to how the SIMD processor processes the multiple data.
Figure 2:
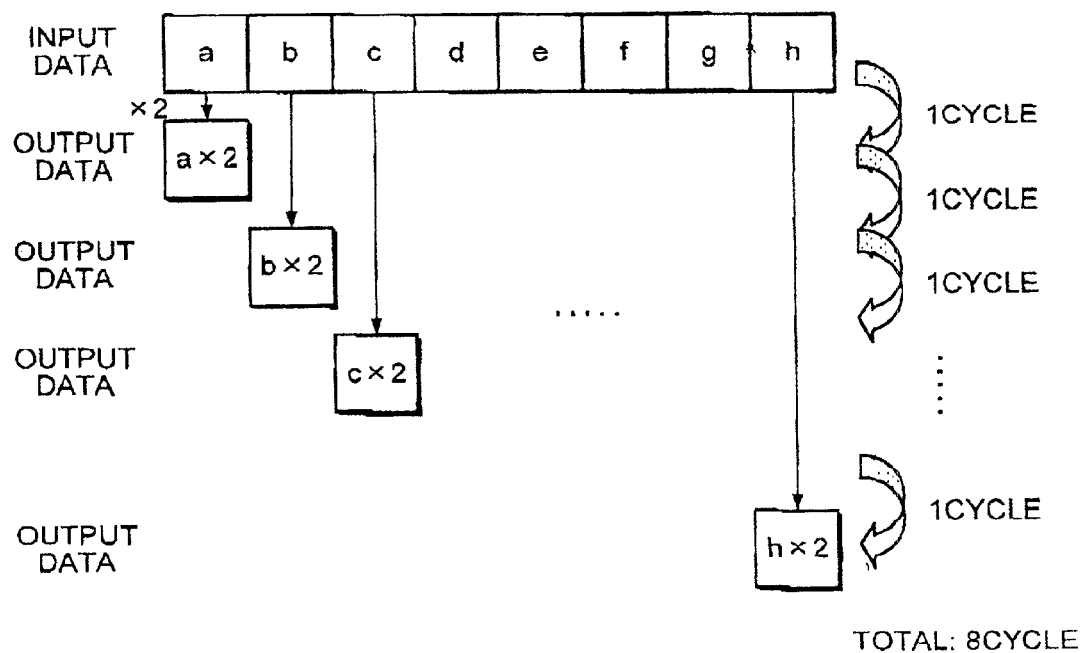
FIG. 2 is a diagram illustrating a conventional processor processes the same data as in FIG. 1.
Figure 3:
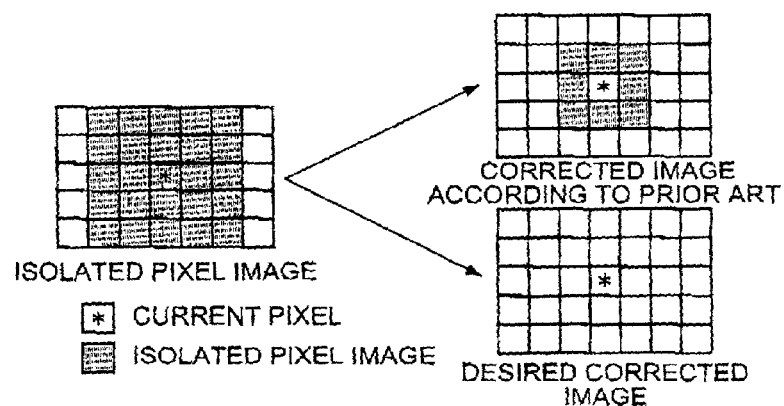
FIG. 3 is a diagram illustrating an isolated portion is removed in a cluster including pixels surrounding the current pixel rather the current pixel alone.
Figure 4:
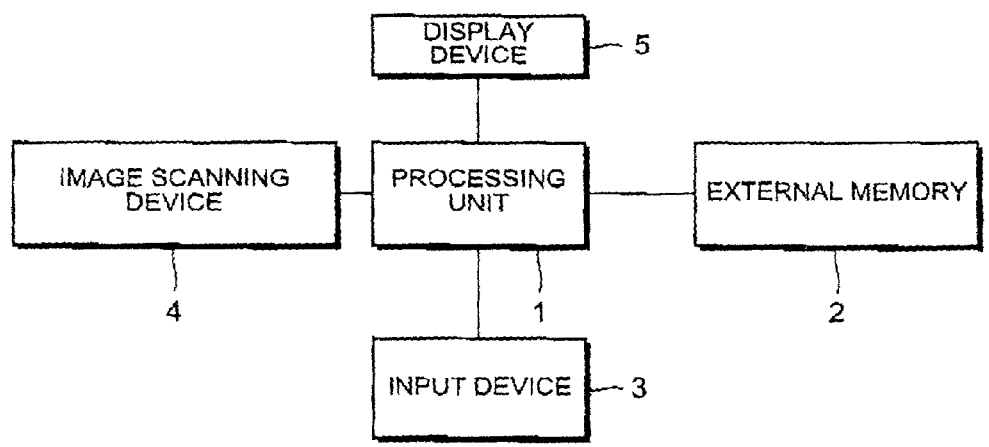
FIG. 4 is a diagram illustrating a preferred embodiment of the image processing apparatus for removing undesirable isolated portions in an image according to the current invention.

Referring now to the drawings, wherein like reference numerals designate corresponding structures throughout the views, and referring in particular to FIG. 4, a diagram illustrates a preferred embodiment of the image processing apparatus for removing undesirable isolated portions in an image according to the current invention. The preferred embodiment includes a central processing unit (CPU) 1 such as a conventional processor for controlling the system or processing an image, an external memory unit 2 for storing data and software programs, an input device 3 such as a keyboard or a mouse for inputting data, a image scanning device 4 for scanning an image and a display device 5 for displaying the image. All of the above devices or units are directly or indirectly interconnected.

Figure 5:
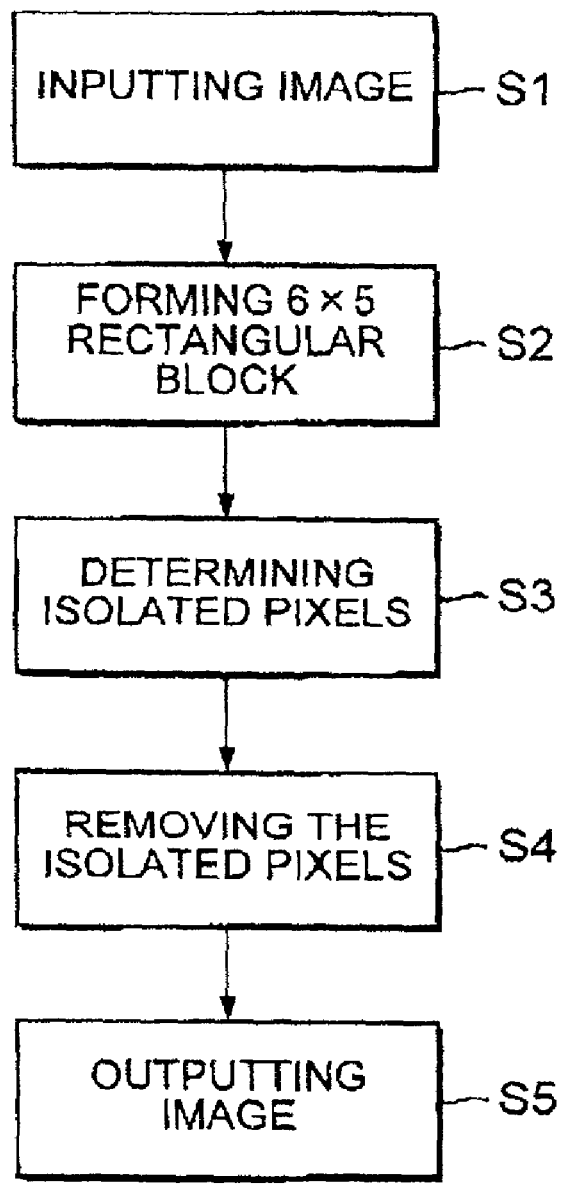
FIG. 5 is an overview flow chart illustrating general steps involved in a preferred process of removing an undesirable isolated portion from an image according to the current invention.

Now referring to FIG. 5, an overview flow chart illustrates general steps involved in a preferred process of removing an undesirable isolated portion from an image according to the current invention. The steps will be described with respect to the devices and the units of the preferred embodiment as shown in FIG. 4. In a step S1, the image scanning device 4 such as an electro-optical conversion means such as a CCD reads an image. In a step 2, the processing unit 1 generates a window or a 5×7 rectangular block of data from the scanned image data with a current pixel being the center of the block for the purpose of determining whether or not an isolated pixel exists. Although the 5×7 block is used in the preferred process, the block size or shape is not limited to the above exemplary size or shape. After the above unit block is generated in the step 2, an isolated portion determination unit determines whether or not a current pixel is an isolation pixel in a step 3. If the current pixel in the block has been already determined as an isolated pixel in the step 3, the isolated portion removing unit replaces the pixel value of every pixel in the block with a predetermined value in a step 4. Alternatively, the pixel values in a portion of the block such as 3×3 or 5×5 are replaced with the predetermined pixel value. Finally, the preferred process outputs the newly replaced pixel values in a step 5. If the current pixel is not determined as an isolated pixel, the input image data will be outputted in the step 5. The above described steps are repeated for the entire image in order to complete the removal of the isolated portions.

Figure 6:
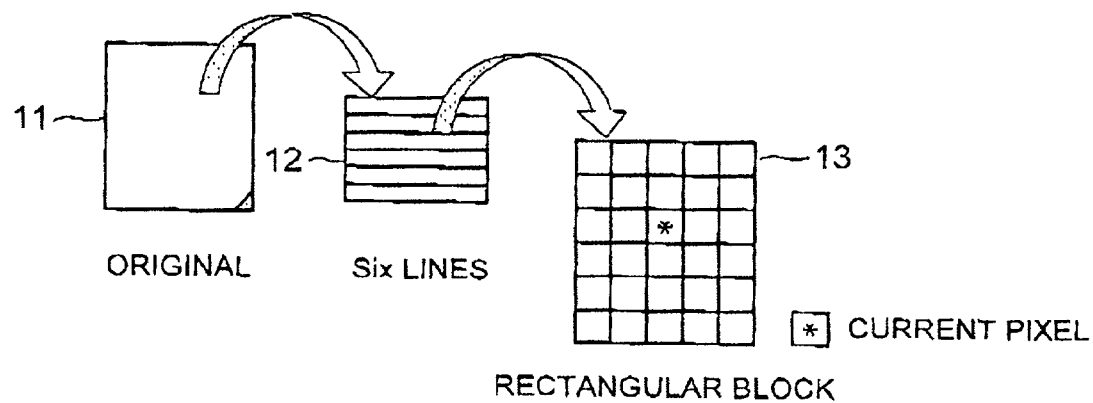
FIG. 6 is a diagram illustrating exemplary steps involved in forming the window or the block that is to be examined for an isolated pixel to be used in the preferred process according to the current invention.

Now referring to FIG. 6, a diagram illustrates exemplary steps involved in forming the window or the block that is to be examined for an isolated pixel to be used in the preferred process according to the current invention. An original document 11 contains an image, and the image is scanned as data in a predetermined digital format. A portion of the data or six lines of the data 12 are isolated to form a block of six rows by five columns of pixels 13. A current pixel position is indicated by an asterisk in the block 13, and the position of the current pixel is substantially the center of the block. After the current block 13 is examined for an isolated pixel or portion, the current pixel position is moved by a predetermined amount in a predetermined direction, and another one of the block 13 is formed with respect to the new current pixel position. The above described steps are repeated until every pixel is included in the block at least once.

Figure 7:
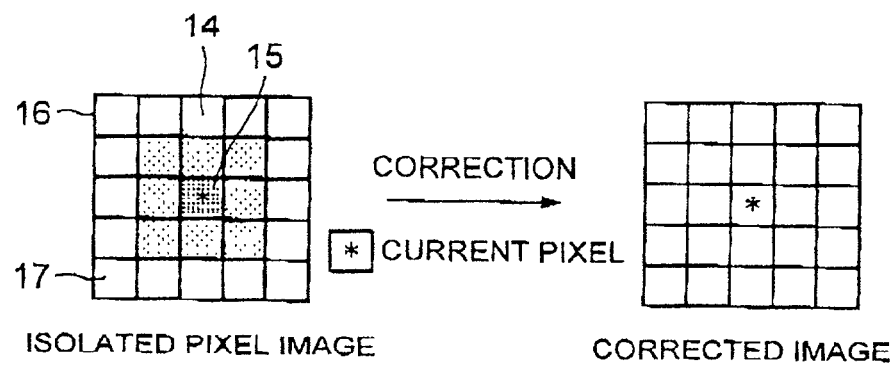
FIG. 7 is a diagram illustrating an exemplary removal of an isolated pixel portion that is accomplished by the preferred process according to the current invention.

Now referring to FIG. 7, a diagram illustrates an exemplary removal of an isolated pixel portion that is accomplished by the preferred process according to the current invention. In a block 16, a current pixel 15 is indicated by an asterisk at the center of a 5×5 pixel block. Assuming that the current pixel 15 has a first pixel value, pixels 14 that surround the current pixel 15 each have a second pixel value while background pixels 17 each have a third pixel value. Because of the pixel value of the current pixel with respect to those of the surrounding pixels 14 and the background pixels 17, the current pixel is determined as an isolated pixel. As a result of the isolated pixel determination, the pixel value of the current pixel 15 and the surrounding pixels 14 is now replaced with that of the background pixels 17. The isolated pixel and the surrounding portion are now thus removed from the original image.

Figure 8:
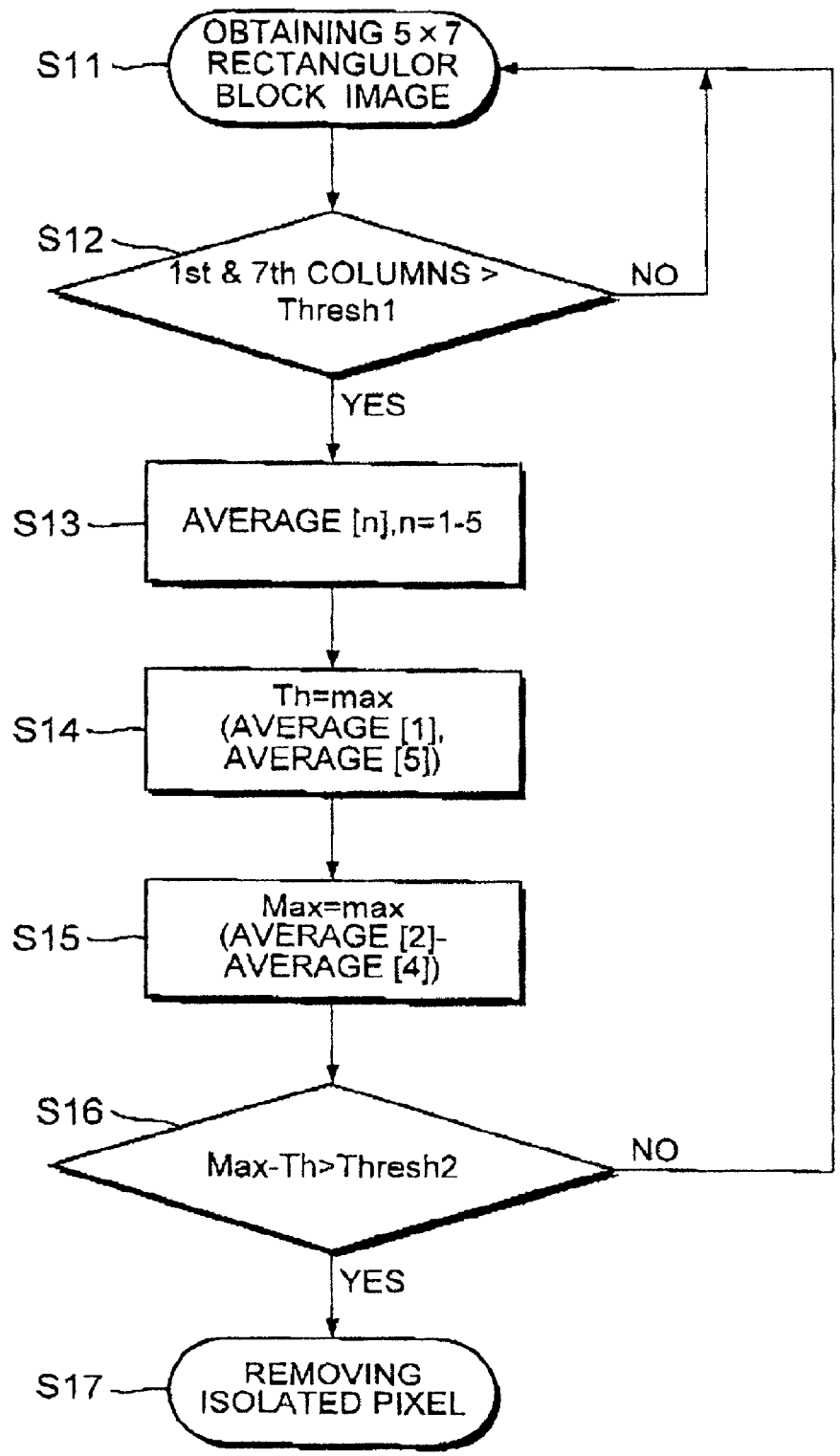
FIG. 8 is a flow chart illustrating exemplary steps involved in detecting an isolated pixel in the block in the preferred process according to the current invention.

Now referring to FIG. 8, a flow chart illustrates exemplary steps involved in detecting an isolated pixel in the block in the preferred process according to the current invention. The steps will be described with respect to the devices and the units of the preferred embodiment as shown in FIG. 4. In a step S11, the processing unit 1 obtains pixel image data for a 5×7 block containing a current pixel that is positioned at the center of the block. In a step 12, the pixel values of the first and seventh columns are each compared to a first predetermined threshold value Thresh1. If every pixel value in the first and seventh columns is smaller than the first predetermined threshold value Thresh1, an isolated pixel flag is set to YES in the step 12. On the other hand, if not every pixel value in the first and seventh columns is smaller than the first predetermined threshold value Thresh1, the isolated pixel flag is set to NO in the step 12. The preferred process then returns to the step S11. The threshold value Thresh1 is set to any pixel value. When the threshold value Thresh1 is set by an operator to a pixel value of a low intensity background area having a pixel value that is lower than 15, the threshold value represents a large amount of noise. The above described isolated pixel determination process is thus accordingly adjusted by the threshold value Thresh1. When the isolated pixel flag is YES, an average pixel value is calculated for each row in the block in a step 13. The first and fifth rows are considered as outer lines while the second through fourth rows are considered as inner lines. The average row pixel value is represented by Average[n], where n is 1 through 5. In a step 14, the larger of Average[1] and Average[5] is assigned to a variable Th. In other words, Th=max (average[1], average[5]), where max (a, b, . . . , n) is a function to determine a maximal number from a through n. Similarly, in a step 15, the largest of Average[2], Average[3] and Average[4] is assigned to a variable Max. In other words, Max=max (average[2], average[3], average[4]), where max (a, b, . . . , n) is a function to determine a maximal number from a through n. In a step 16, it is determined whether or not the difference between Max and Th is larger than a second predetermined threshold value Thresh2. That is, Max−Th>Thresh2. When the above difference is larger than Tresh2, the isolated pixel flag remains YES. On the other hand, the above difference is not larger than Tresh2, the isolated pixel flag is changed to contain No. Based upon the isolated pixel flag, the preferred process performs a removal step 17. If the isolated pixel flag is YES, the 5×5 rectangular block with the current pixel at the center is considered to have an isolated portion. As a result of the above determination, every pixel value in the block is replaced with zero. In contrast, if the isolated pixel flag is NO, the 5×5 rectangular block with the current pixel at the center is not considered to have an isolated portion. The preferred process returns to the step 11. The pixel values in the block are left intact, and the original pixel values are outputted.

Figure 9:
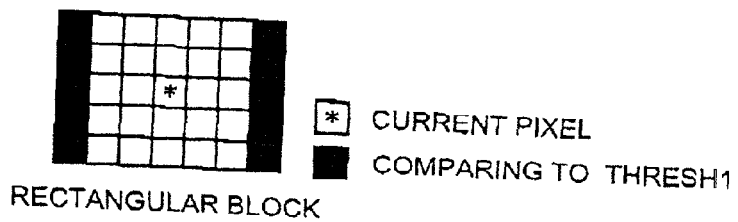
FIG. 9 is a diagram illustrating the position and direction of the columns to be compared to a predetermined threshold value in the preferred process according to the current invention.

Referring to FIG. 9, a diagram illustrates the position and direction of the columns to be compared to a predetermined threshold value in the preferred process according to the current invention. As described above with respect to the step 12 in FIG. 8, in an exemplary 5×7 block containing a current pixel that is positioned at the center of the block, the pixel values of the first and seventh columns are each compared to the first predetermined threshold value Thresh1. Pixels in the first and seventh columns are shown in a dark color to indicate that the columns are located at either end of the block. Although the columns to be compared are specified as the first and seventh columns in the above exemplary block, the columns to be compared are not limited to the above columns in other blocks of a different size. The columns to be compared are generally located at the ends of the block.

Figure 10:
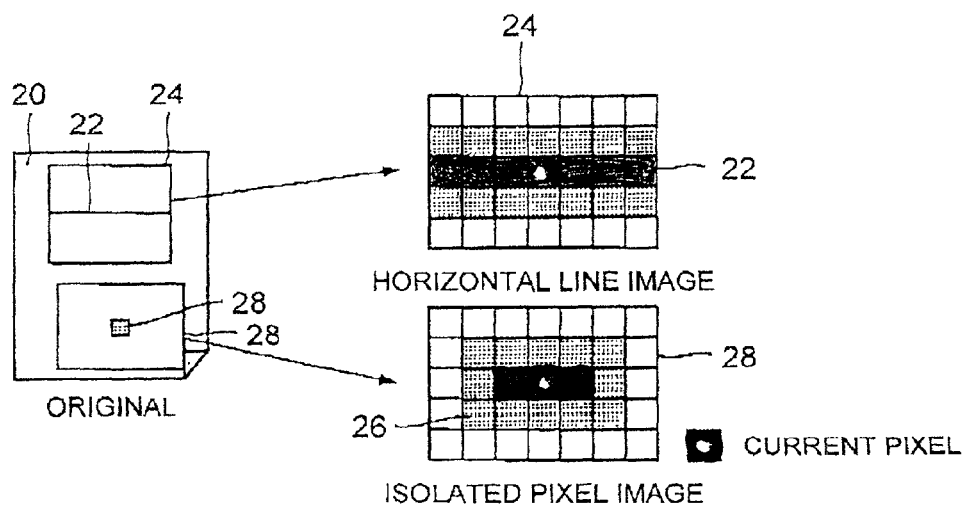
FIG. 10 is a diagram illustrating a general purpose of the comparison of the two end columns to a predetermined threshold value as performed in the step of the preferred process according to the current invention.

Now referring to FIG. 10, a diagram illustrates a general purpose of the comparison of the two end columns to a predetermined threshold value as performed in the step 12 of the preferred process according to the current invention. By comparing the end columns to a predetermined threshold value, the continuity in an image portion is considered in a horizontal direction. In other words, a horizontal line or a similar image portion is correctly distinguished from an isolated portion, and an erroneous detection of a horizontal line is prevented. As shown in an upper portion of an original image 20, a horizontal line 22 reaches both sides of the block 24. As also shown in an enlarged view of the block 24, the horizontal line 22 is represented by a group of seven dark pixels while adjacent areas to the horizontal line 22 are represented by two groups of seven gray pixels. Assuming that the dark pixel values are higher than the first predetermined threshold value, certain pixel values in the first and seventh columns are not smaller than the first predetermined threshold value. Thus, the above comparison result in the step S12 indicates that the line 22 is not likely an isolated image portion. On the other hand, the dark pixel portion 26 does not reach the sides of a block 28. As shown in a corresponding enlarged view, the dark pixels 26 occupy three pixel positions while gray pixels surround the dark pixels 26. None of the dark pixels 26 occupies the first or seventh column of the block 28. Thus, the above comparison result in the step S12 indicates that the pixel portion 26 is likely an isolated image portion.

Figure 11:
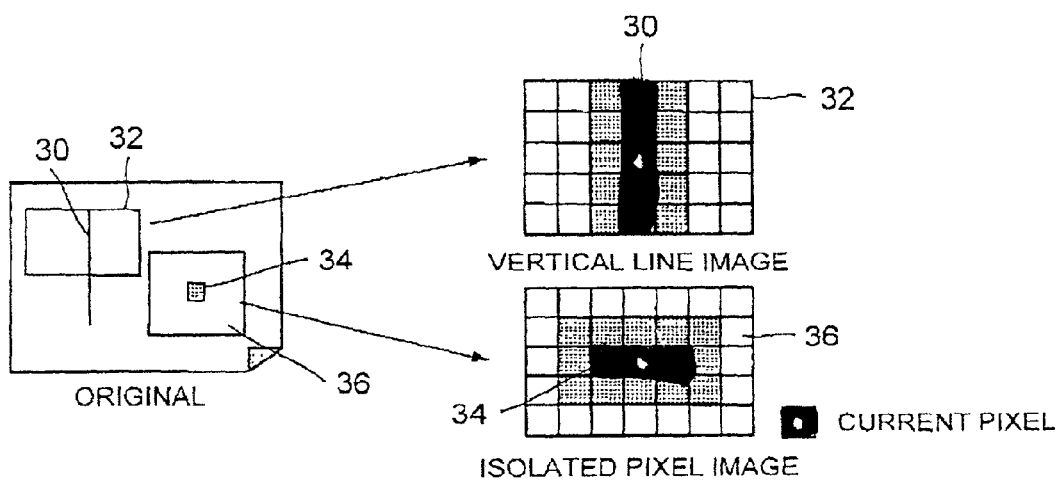
FIG. 11 is a diagram illustrating a vertical line detection in the preferred process according to the current invention.

Now referring to FIG. 11, a diagram illustrates the detection of a vertical line in the preferred process according to the current invention. A vertical line 30 exists in an image, and a block 32 intersects the vertical line 30. As shown in an enlarged view, the vertical line 30 reaches the top and bottom sides of the block 32. On the other hand, an isolated portion 34 exists in a block 36 and does not reach the top and bottom line of the block 32 as shown in a corresponding enlarged view.

Figure 12:
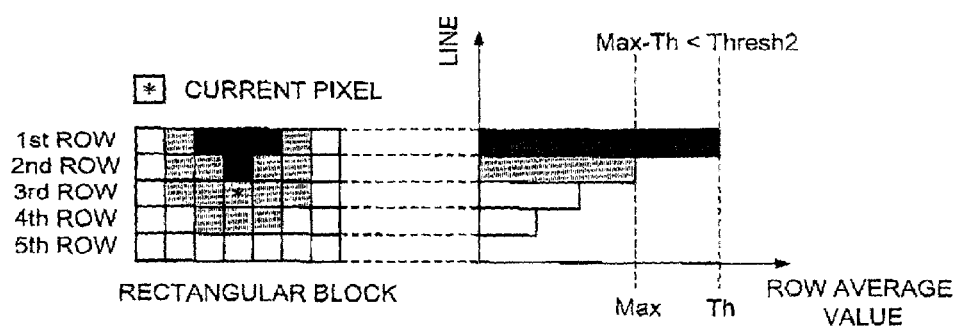
FIG. 12 is a diagram illustrating one example of the comparison of the above determined value to a second predetermined threshold value as performed in the step of the preferred process according to the current invention.

Now referring to FIG. 12, a diagram illustrates one example of the comparison of the above determined value to a second predetermined threshold value as performed in the step 16 of the preferred process according to the current invention. As described above with respect to the step 16 of the preferred process, the first variable Th is determined by assigning the larger of the average pixel values from the first and fifth rows of the 5×7 block. The second variable Max is determined by assigning the largest of the average pixel values from the second through fourth rows of the same 5×7 block. The difference of the two variables, Th and Max is then compared to the second threshold value Thresh2. In general, the significance of the above comparison result is to detect a vertical line or a possible continuity of an image portion in a vertical direction. The average pixel value of the first row is the highest while that of the fifth row is the lowest. Since Th is the average pixel value of the first row and Max is the average pixel value of the second row, the difference between the two or Max−Th is indicated by a double headed arrow. Assuming the difference is smaller than the second predetermined threshold value, Thresh2, as tested in the step 16 of the preferred process, a vertical line or a vertical continuity is detected. As a result of the vertical continuity, an isolated pixel removal procedure is not performed.

Figure 13:
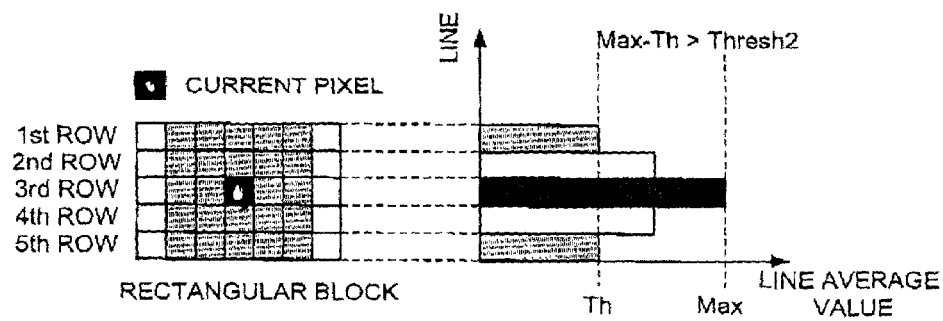
FIG. 13 is a diagram illustrating another example of the comparison of the above determined value to the second predetermined threshold value as performed in the step of the preferred process according to the current invention.

Now referring to FIG. 13, a diagram illustrates another example of the comparison of the above determined value to the second predetermined threshold value as performed in the step 16 of the preferred process according to the current invention. As described above with respect to the step 16 of the preferred process, the first variable Th is determined by assigning the larger of the average pixel values from the first and fifth rows of the 5×7 block. The second variable Max is determined by assigning the largest of the average pixel values from the second through fourth rows of the same 5×7 block. The difference of the two variables, Th and Max is then compared to the second threshold value Thresh2. In general, the significance of the above comparison result is to detect a vertical line or a possible continuity of an image portion in a vertical direction. The average pixel value of the third row is the highest while that of the first and fifth rows is the lowest. Since Th is the average pixel value of the first or fifth row and Max is the average pixel value of the third row, the difference between the two or Max−Th is indicated by a double headed arrow. Assuming the difference is larger than the second predetermined threshold value, Thresh2, as tested in the step 16 of the preferred process, a vertical line or a vertical continuity is not detected. As a result of the lack of any vertical continuity, an isolated pixel removal procedure is performed to remove an isolated portion.

Figure 14:
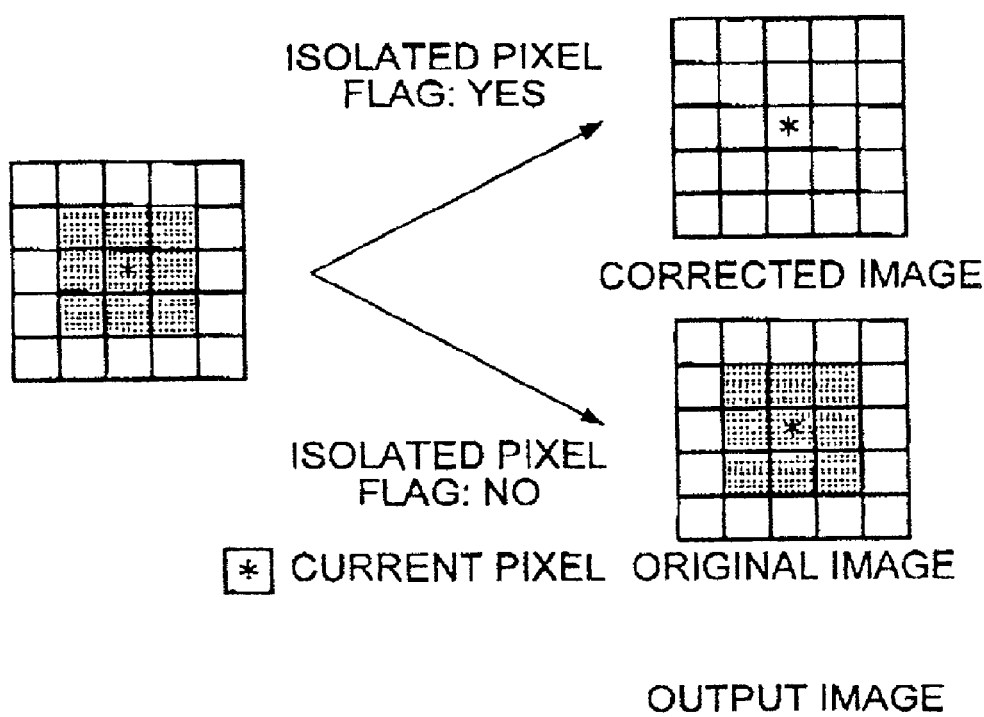
FIG. 14 is a diagram illustrating one exemplary step of removing an isolated portion as performed in the step of the preferred process according to the current invention.

Now referring to FIG. 14, a diagram illustrates one exemplary step of removing an isolated portion as performed in the step 17 of the preferred process according to the current invention. As described above with respect to the step 17 of the preferred process, if the isolated pixel flag is YES, the 5×5 rectangular block with the current pixel at the center is considered to have an isolated portion. As a result of the above determination, every pixel value in the block is replaced with a predetermined value such as zero or a background value. In contrast, if the isolated pixel flag is NO, the 5×5 rectangular block with the current pixel at the center is not considered to have an isolated portion. The pixel values in the block are left intact, and the original pixel values are outputted.

Figure 15:
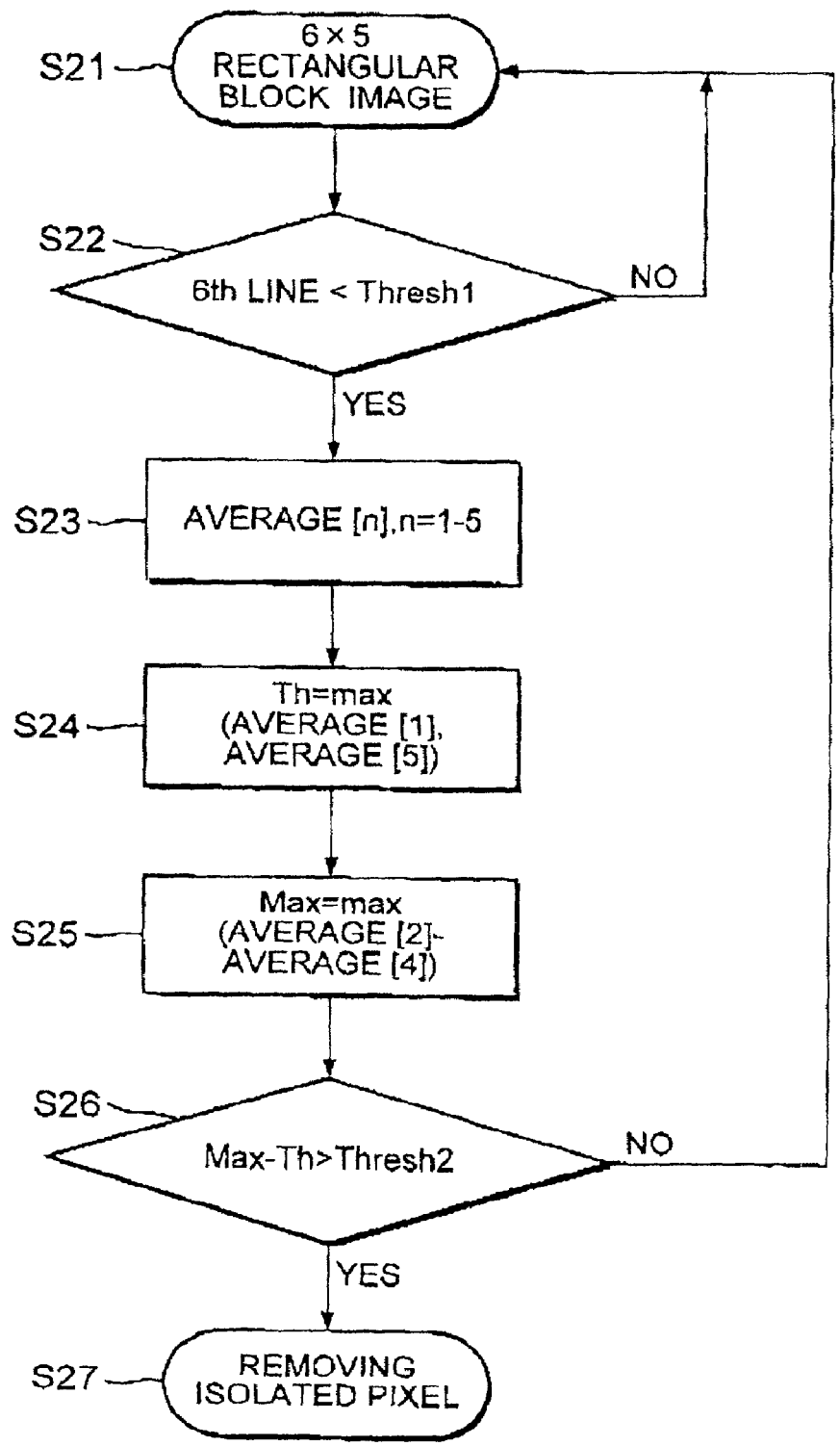
FIG. 15 is a flow chart illustrating exemplary steps involved in detecting an isolated pixel in the block in a second preferred process according to the current invention.

Now referring to FIG. 15, a flow chart illustrates exemplary steps involved in detecting an isolated pixel in the block in a second preferred process according to the current invention. The steps will be described with respect to the devices and the units of the preferred embodiment as shown in FIG. 4. In a step S21, the processing unit 1 obtains pixel image data for a 6×5 block containing a current pixel that is positioned at the center of the block. In a step 22, the pixel values of the sixth row or the bottom row are each compared to a first predetermined threshold value Thresh1. The bottom row is selected to consider the continuity between the bottom portion of the current block and the top portion of the immediately adjacent block below. A pixel counter C is initialized to zero. If a pixel value in the sixth row is smaller than the first predetermined threshold value Thresh1, the pixel counter C is incremented by one in the step 22. On the other hand, if a pixel value in the sixth row is larger than the first predetermined threshold value Thresh1, the pixel counter is set to zero in the step 22. The preferred process then returns to the step S21. The threshold value Thresh1 is set to any pixel value. When the threshold value Thresh1 is set by an operator to a pixel value of a low intensity background area having a pixel value that is lower than 15, the threshold value represents a large amount of noise. The above described isolated pixel determination process is thus accordingly adjusted by the threshold value Thresh1. An average pixel value is calculated for each column except for the sixth row in the block in a step 23. The first and fifth columns are considered as outer lines while the second through fourth columns are considered as inner lines in a 5×5 pixel block. The average column pixel value is represented by Average[n], where n is 1 through 5 indicative of the first through fifth column. In a step 24, the larger of Average[1] and Average[5] is assigned to a variable Th. In other words, Th=max (average[1], average[5]), where max (a, b, . . . , n) is a function to determine a maximal number from a through n. Similarly, in a step 25, the largest of Average[2], Average[3] and Average[4] is assigned to a variable Max. In other words, Max=max (average[2], average[3], average[4]), where max (a, b, . . . , n) is a function to determine a maximal number from a through n. In a step 26, it is determined whether or not the difference between Max and Th is larger than a second predetermined threshold value Thresh2. That is, Max−Th >Thresh2. When the above difference is larger than Tresh2 and the pixel counter C holds a value that is larger than a predetermined counter threshold value ThreshCth, the isolated pixel flag remains YES. On the other hand, the above difference is not larger than Tresh2 or the pixel counter C holds a value that is not larger than a predetermined counter threshold value ThreshCth, the isolated pixel flag is set to contain No. Based upon the isolated pixel flag content, the preferred process performs a removal step 27. If the isolated pixel flag is YES, the 5×6 rectangular block with the current pixel at the center is considered to have an isolated portion. As a result of the above determination, every pixel value in the block is replaced with zero. In contrast, if the isolated pixel flag is NO, the 5×6 rectangular block with the current pixel at the center is not considered to have an isolated portion. The preferred process returns to the step 21. The pixel values in the block are left intact, and the original pixel values are outputted.

Figure 16:
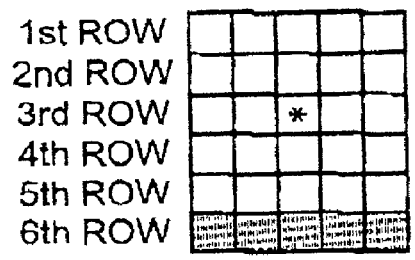
FIG. 16 is a diagram illustrating the position and direction of the row to be compared to a predetermined threshold value in the second preferred process according to the current invention.

Referring to FIG. 16, a diagram illustrates the position and direction of the row to be compared to a predetermined threshold value in the second preferred process according to the current invention. As described above with respect to the step 22 in FIG. 15, in an exemplary 6×5 block containing a current pixel that is positioned at the center of the block, the pixel values of the sixth row are each compared to the first predetermined threshold value Thresh1. Pixels in the sixth row are shown in a dark color to indicate that the row is located at the bottom of the block. The current pixel is indicated by an asterisk and is located at the third column and the third row. Although the row to be compared are specified as the sixth row in the above exemplary block, the rows to be compared are not limited to the above row in other blocks of a different size. The rows to be compared are generally located at the top or bottom of the block.

Figure 17:
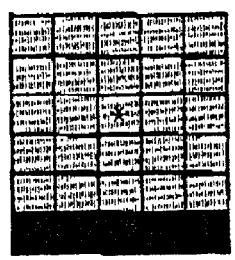
FIG. 17 is a diagram illustrating the position and direction of a group of rows to be averaged and the row to be compared to the predetermined threshold value in the second preferred process according to the current invention.

Referring to FIG. 17, a diagram illustrates the position and direction of a group of rows to be averaged and the row to be compared to the predetermined threshold value in the second preferred process according to the current invention. As described above with respect to the step 22 in FIG. 15, in an exemplary 6×5 block containing a current pixel that is positioned at the center of the block, the pixel values of the sixth row are each compared to the first predetermined threshold value Thresh1. Pixels in the sixth row are shown in a dark color to indicate that the row is located at the bottom of the block. A group of rows to be averaged in the step 23 include a first row through the fifth row and is indicated by a gray color. The current pixel is indicated by an asterisk and is located at the third column and the third row.

Figure 18:
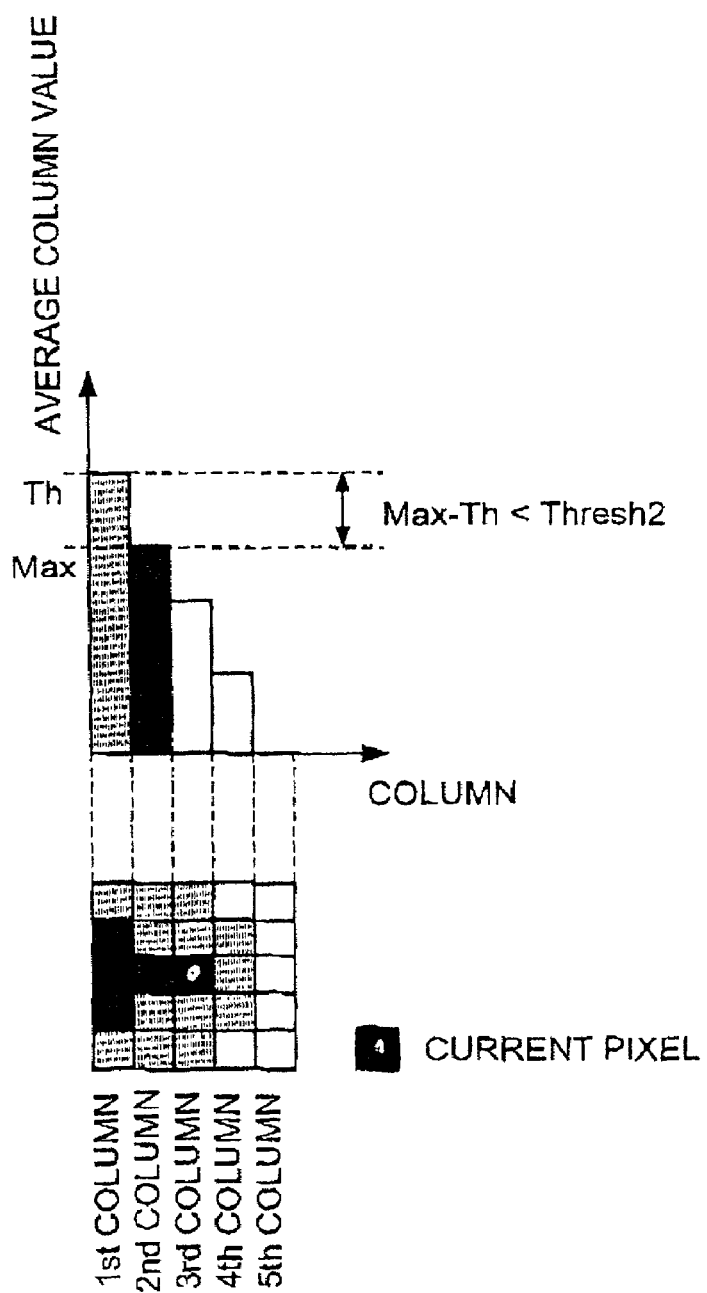
FIG. 18 is a diagram illustrating one example of the comparison of the above determined value to a second predetermined threshold value as performed in the step of the preferred process according to the current invention.

Now referring to FIG. 18, a diagram illustrates one example of the comparison of the above determined value to a second predetermined threshold value as performed in the step 26 of the preferred process according to the current invention. As described above with respect to the step 26 of the preferred process, the first variable Th is determined by assigning the larger of the average pixel values from the first and fifth column of the 5×5 block. The second variable Max is determined by assigning the largest of the average pixel values from the second through fourth columns of the same 5×5 block. The difference of the two variables, Th and Max is then compared to the second threshold value Thresh2. In general, the significance of the above comparison result is to detect a horizontal line or a possible continuity of an image portion in a horizontal direction. The average pixel value of the first column is the highest while that of the fifth column is the lowest. Since Th is the average pixel value of the first column and Max is the average pixel value of the second column, the difference between the two or Max−Th is indicated by a double headed arrow. Assuming the difference is smaller than the second predetermined threshold value, Thresh2, as tested in the step 26 of the second preferred process, a horizontal line or a vertical continuity is possibly detected. As a result of the horizontal continuity, an isolated pixel removal procedure is not performed.

Figure 19:
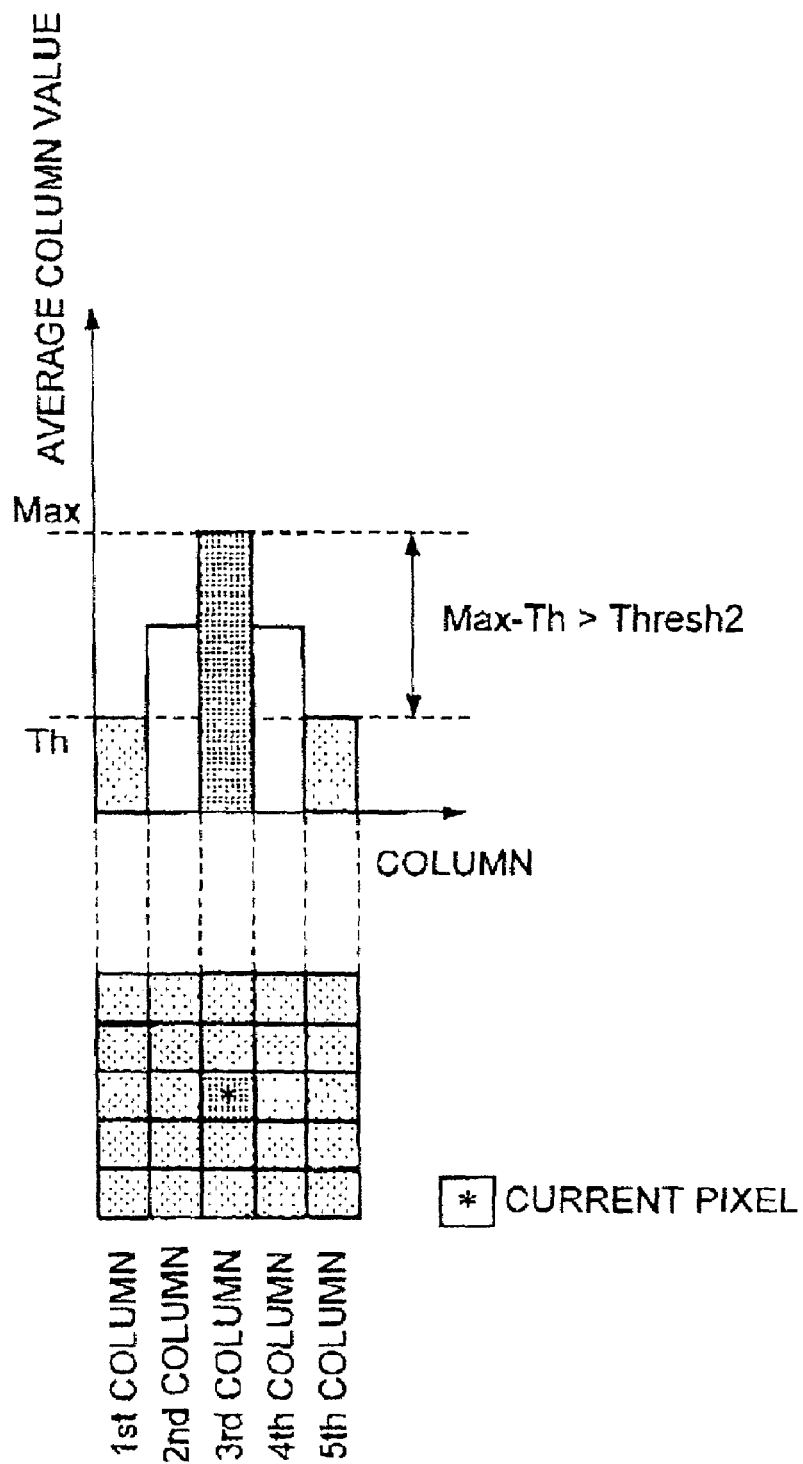
FIG. 19 is a diagram illustrating another example of the comparison of the above determined value to the second predetermined threshold value as performed in the step of the preferred process according to the current invention.

Now referring to FIG. 19, a diagram illustrates another example of the comparison of the above determined value to the second predetermined threshold value as performed in the step 26 of the preferred process according to the current invention. As described above with respect to the step 26 of the preferred process, the first variable Th is determined by assigning the larger of the average pixel values from the first and fifth columns of the 5×5 block. The second variable Max is determined by assigning the largest of the average pixel values from the second through fourth columns of the same 5×5 block. The difference of the two variables, Th and Max is then compared to the second threshold value Thresh2. In general, the significance of the above comparison result is to detect a horizontal line or a possible continuity of an image portion in a horizontal direction. The average pixel value of the third column is the highest while that of the first and fifth columns is the lowest. Since Th is the average pixel value of the first or fifth column and Max is the average pixel value of the third column, the difference between the two or Max−Th is indicated by a double headed arrow. Assuming the difference is larger than the second predetermined threshold value, Thresh2, as tested in the step 26 of the second preferred process, a horizontal line or a horizontal continuity is not detected. As a result of the lack of any horizontal continuity, an isolated pixel removal procedure is performed to remove an isolated portion.

Figure 20:
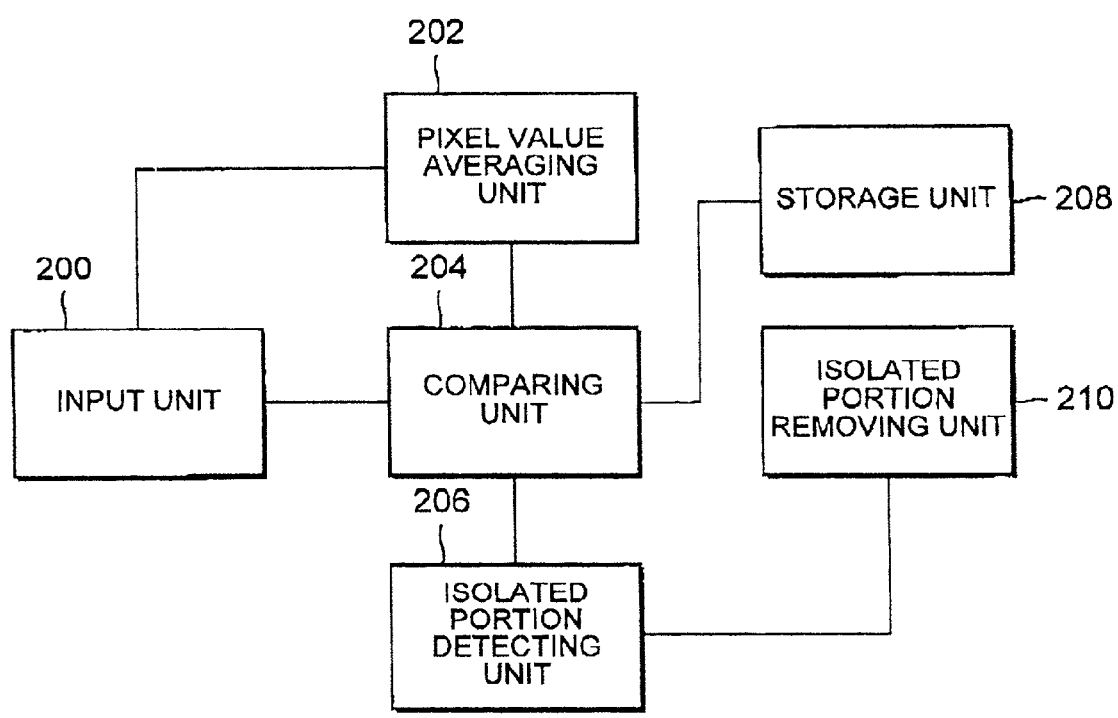
FIG. 20 is a diagram illustrating elements or components of a preferred embodiment of the system for detecting and removing isolated portion in an image according to the current invention.

Now referring to FIG. 20, a diagram illustrates elements or components of a preferred embodiment of the system for detecting and removing isolated portion in an image according to the current invention. An input unit 200 inputs image data in a digital format to a pixel value averaging unit 202 and a comparing unit 204. The pixel value averaging unit 202 averages lines of pixel values in a specified direction in a predetermined block unit. For example, the pixel value averaging unit 202 averages pixel values of rows of pixels in the block that contains a current pixel. The comparing unit 204 compares specified groups of pixel data and outputs a first comparison result signal. For example, the comparing unit 204 compares a first and a seventh columns of the 5×7 pixel block to a predetermined first threshold value that is stored in a storage unit 208. Similarly, the comparing unit 204 compares specified groups of the average pixel values such as an inner group of columns and selects a group having the largest pixel average value. The first and fifth columns are considered as outer lines while the second through fourth columns are considered as inner lines in a 5×5 pixel block. An isolated portion detecting unit 206 further processes the first comparison result signal and the selected large groups of the average pixel values. For example, the isolated portion detecting unit 206 determines the difference between the largest inner lines and the largest outer lines and sends the difference to the comparing unit 204 for comparing the difference to a predetermined second threshold value that is stored in the storage unit 208. The comparing unit 204 generates a second comparison result signal. Lastly, based upon the first and second comparison result signals, the isolated portion detecting unit 206 determines whether or not an isolated portion exists in the current pixel block and initiates the isolated portion removing unit 210 to perform the isolated portion removal. The isolated portion removing unit 210 replaces the current and certain surrounding pixel values with a predetermined value such as zero or background value.

Figure 21:
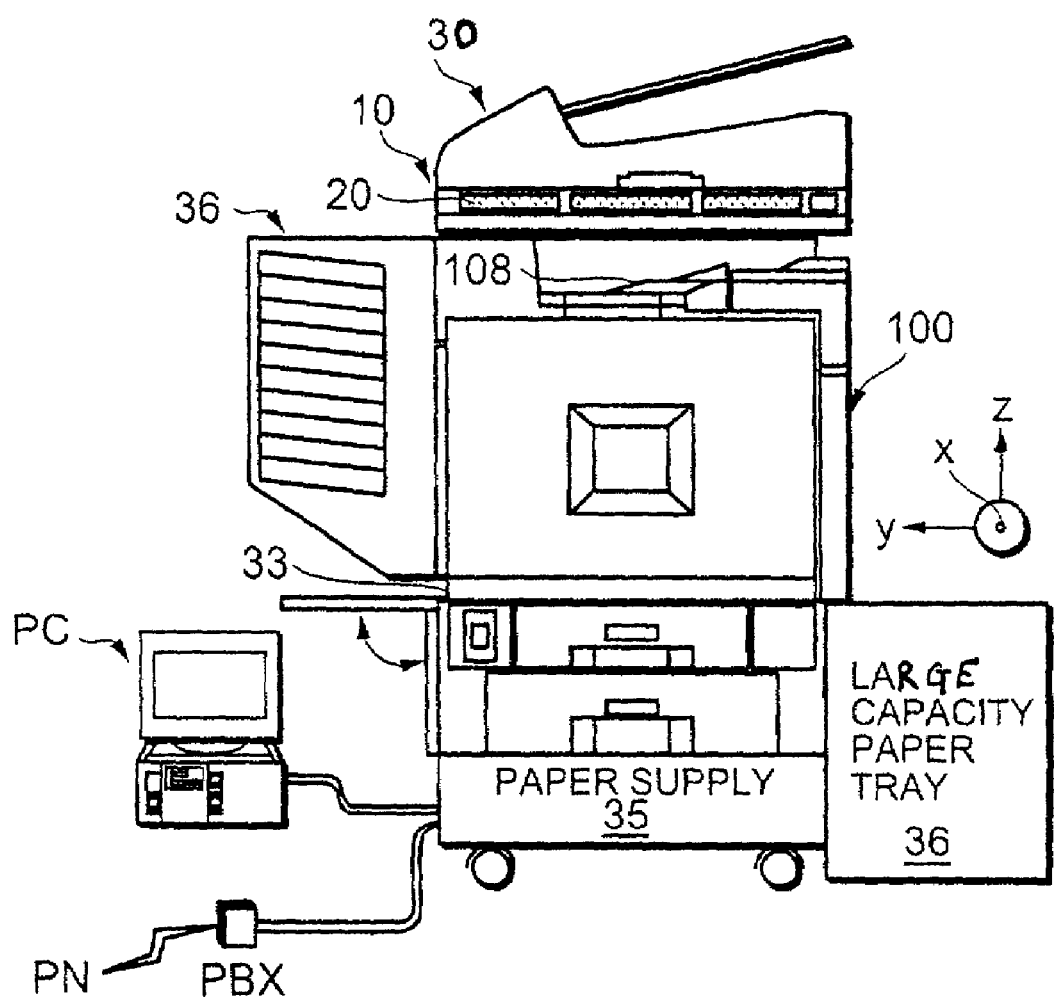
FIG. 21 is a diagram illustrating a second preferred embodiment of the multi-functional full color digital copier according to the current invention.

Now referring to FIG. 21, a diagram illustrates a second preferred embodiment of the multi-functional full color digital copier according to the current invention. The full color copier generally includes a color scanner unit 10, an operation control board 20, an automatic document feeder (ADF) 30, a color printer unit 100, a double-side drive unit 33, a finisher unit 34 with a stapler and a tray for carrying the output sheets, a paper supply bank unit 35 and a large-capacity paper tray 36. Alternatively, the output is placed on a paper tray 108. A personal computer PC is connected to the digital copier via a local area network (LAN), and a telephone line PN is connected to the facsimile unit via a PBX unit.

Figure 22:
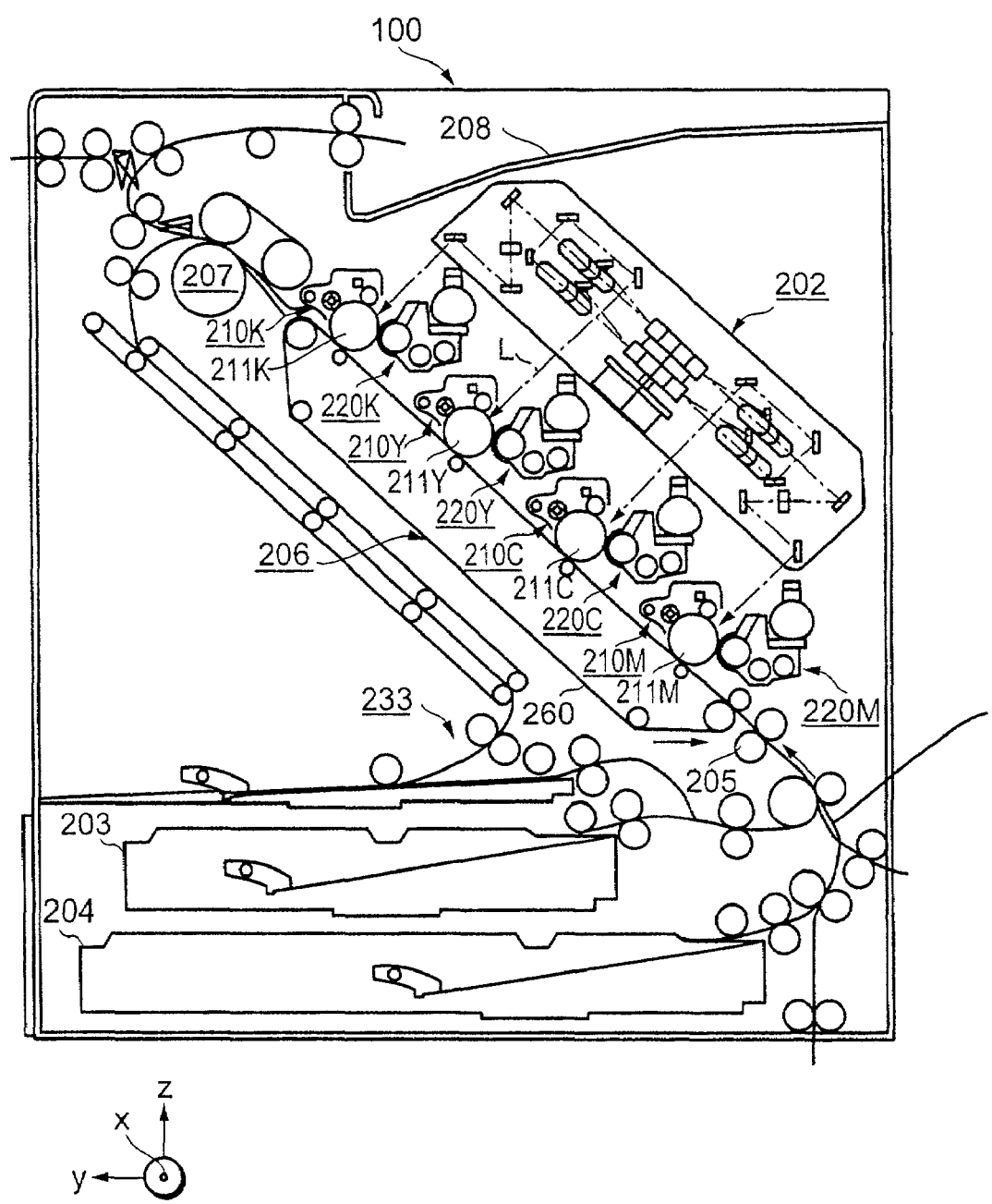
FIG. 22 is a diagram illustrating components of the color printer of the second preferred embodiment according to the current invention.

FIG. 22 is a diagram illustrating components of the color printer 100 of the second preferred embodiment according to the current invention. In this preferred embodiment, the color printer 100 is a laser printer. The laser printer 100 further includes four toner-image forming units for magenta (M), cyan (C), yellow (Y) and black (K). The four toner-image forming units are located along the moving direction of the image-transfer medium. That is, the laser printer is a four-drum full color image developing device. The magenta toner-image forming unit also includes a developer unit 220M and a photoreceptor unit 210M that houses a photoreceptor drum 211M for a magenta color. The cyan toner-image forming unit also includes a developer unit 220C and a photoreceptor unit 210C that houses a photoreceptor drum 211C for a cyan color. The yellow toner-image forming unit also includes a developer unit 220Y and a photoreceptor unit 210Y that houses a photoreceptor drum 211Y for a yellow color. The black toner-image forming unit also includes a developer unit 220K and a photoreceptor unit 210K that houses a photoreceptor drum 211K for a black color.

Still referring to FIG. 22, the rotational axis of the photoreceptor drums 211M, 211C, 211Y and 211K is parallel to the x axis. The four toner-image forming units are positioned so that the moving direction of the image-transfer medium has 45 degrees with respect to the y axis. The photoreceptor drum in the photoreceptor units 210C, 210Y, 210M and 210K has a diameter of approximately 30 mm and an organic photo compound (OPC) layer. Furthermore, the laser printer 100 includes an optical writing unit 202, a paper supply cartridges 203, 204, a pair of resist rollers 205, an image transfer belt unit 206 having an image transfer belt 260 for holding an image-transfer medium at an image transfer position for each image-forming unit, an image fix unit 207 using a belt fix method and a double-side drive unit 233. The optical writing unit 202 further includes an optical source, a polygon mirror, a f-θ lens and a reflector mirror. The optical writing unit 202 projects laser onto the surface of the photoreceptor drums 211M, 211C, 211Y and 211K in the x running direction based upon the image data. The dotted line indicates the transfer path of the image-transfer medium. An image-transfer medium from the paper supply cassettes 203 and 204 is guided towards the resist rollers 205 via other rollers that are not illustrated in the drawings. The image-transfer medium is sent to the image-transfer belt 260 at a predetermined timing. The image-transfer medium is then held by the image-transfer belt 260 so that the image-transfer medium is carried to predetermined image-transfer positions with respect to the four toner-image forming units. The toner image on the photoreceptor drums 211M, 211C, 211Y and 211K is transferred onto an image-carrying medium that is held on the image-transfer belt 260. The image-carrying medium having an image that is formed from the overlapping toner colors is now transferred to an image fixing unit 207. Since the toner is directly transferred onto the image-carrying medium, the image fixing unit 207 fixes the toner image on the image-carrying medium. The fixed image-carrying medium is transferred to the output tray 108, the finisher unit or the double-side drive unit 233.

The yellow toner image forming unit will be described in detail in the following. Other toner image forming units such as cyan, magenta and black have the substantially identical structures and operations. As described above, the yellow toner-image forming unit further includes the developer unit 220Y and the photoreceptor unit 210Y that houses a photoreceptor drum 211Y for a yellow color. In addition, the photoreceptor unit 210Y also includes a brush roller for brushing lubricating material on the photoreceptor drum surface, a movable cleaning blade for cleaning the photoreceptor drum surface, a discharge lamp for discharging the photoreceptor drum surface and a non-contacting charge roller for uniformly charging the photoreceptor drum surface. After alternating voltage is applied to the surface of the photoreceptor drum 211Y, the optical writing unit 202 projects polarizes laser light L from the polygon mirror based upon the print image data. As a result, a static image is formed on the of the photoreceptor drum 211Y. Subsequently, the developer unit 220Y develops the static image to form a yellow toner image. At the predetermined position of the image-carrying medium on the transfer belt 260, the yellow toner image on the photoreceptor drum 211Y is transferred onto the image-carrying medium. After the image transfer, the brush roller brushes a predetermined amount of lubricating material onto the surface of the photoreceptor drum 211Y, and the cleaning blade cleans the surface while the discharge lamp discharges the photoreceptor drum surface for a next image formation step.

The developer unit 220Y stores two-part developer including magnetic carrier or negatively charged toner. The developer unit 220Y further includes a developer roller that is partially exposed through an opening on the photoreceptor drum, a transfer screw, a doctor blade, a toner concentration censor and a powder pump. The developer in the developer unit is charged by transferring and agitating via the transfer screw. A portion of the developer is held on the developer roller surface. The doctor blade unifies the layer thickness of the developer on the developer surface, and the developer is transferred from the developer surface onto the photoreceptor drum. By the above toner transfer, a toner image appears on the photoreceptor drum 211Y according to the static image. The toner concentration sensor detects the toner concentration of the developer in the developer unit. In case of a low concentration, the power pump is activated to provide the toner. The transfer belt 260 of the transfer belt unit 206 wraps around four rollers so that it passes the predetermined positions to oppose each of the four photoreceptor drum units 211M, 211C, 211Y and 211K. Among the four rollers, an entrance roller that is indicated by double-dotted lines and is located near an upstream entry of an image-carrying medium in the moving direction of the image-carrying medium along the transfer belt 260. The entrance roller includes a static absorbing roller that is opposed to the entrance roller, and a predetermined voltage is applied to the roller from a power source. The image-carrying medium that has passed the above pair of rollers is held on the transfer belt 260 by static.

Another roller near a downstream exit of the image-carrying medium path is a frictionally operated and is driven by a power source that is not illustrated. The outer surface of the transfer belt 260 is contacted by a biased roller where a predetermined voltage is applied for cleaning. The cleaning bias roller removes residuals such as toner on the transfer belt 260. A transfer bias material is placed on the inner surface of the transfer belt 260 that forms a contact portion in the four photoreceptor drum units 211M, 211C, 211Y and 211K. The transfer bias material is fixed brush and is charged by a corresponding transfer bias voltage source. Due to the transfer bias voltage, the transfer belt 260 is charged, and a predetermined voltage is applied between the transfer belt 260 at a transfer position and the photoreceptor drum surface.

Figure 23:
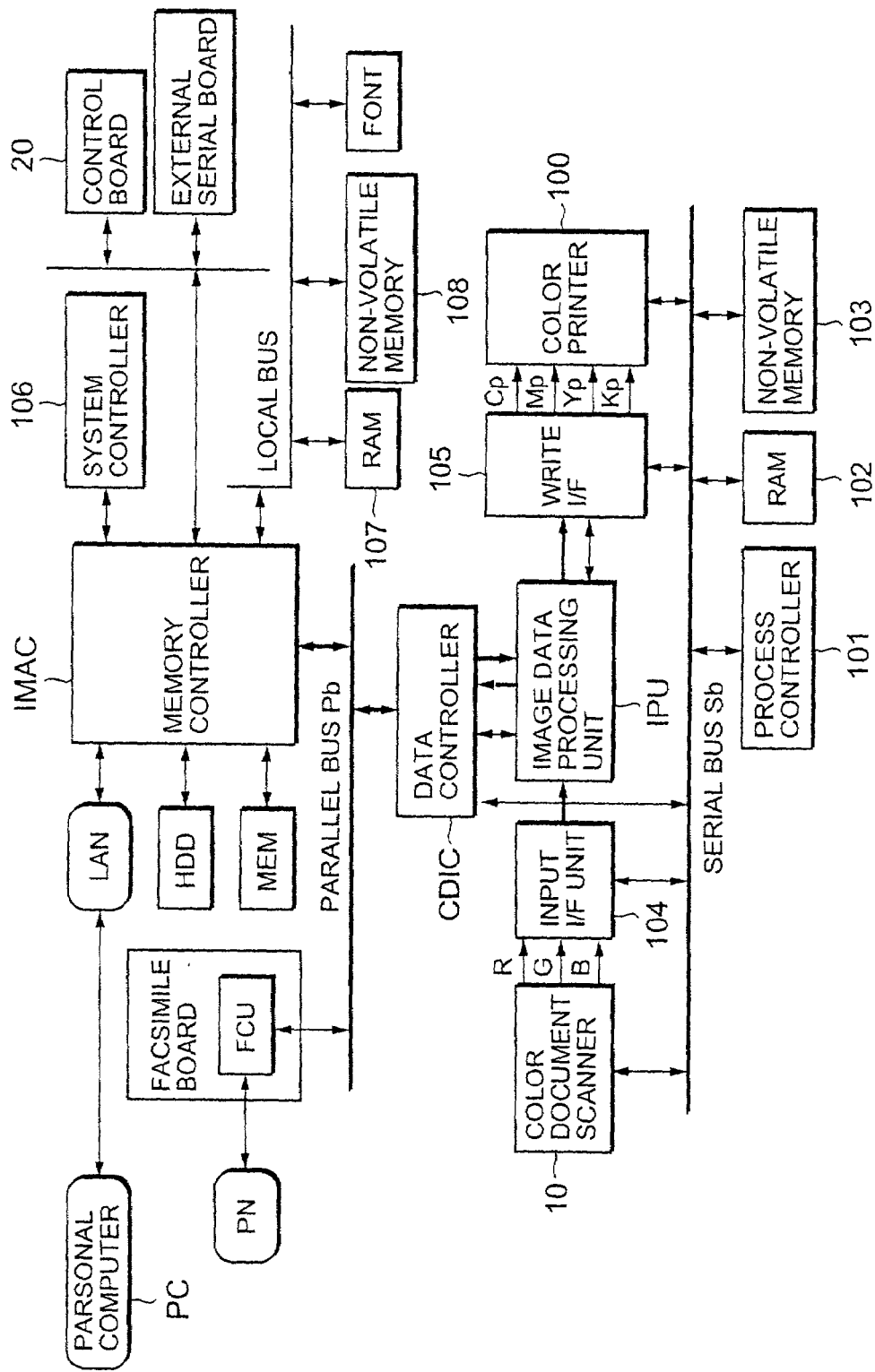
FIG. 23 is a diagram illustrating major electronic system components of the preferred embodiment of the copier according to the current invention.

Now referring to FIG. 23, a diagram illustrates major electronic system components of the preferred embodiment of the copier according to the current invention. The color document scanner 10 focuses the light upon photo detection elements via a lens or a mirror in an optical reading unit, and the light is reflected from a document. The photo detection elements such as a CCD is located on a sensor board of the optical reading unit. The CCD converts RGB signals into corresponding electrical signals. An input I/F unit 104 converts the electrical signals into eight-bit digital image data. After image data corrections such as the CCD in-between line distance and the main-scanning resist adjustment, an image data processing unit (IPU) further processes the corrected image data. A data controller CDIC unit variably processes the CMYK image data as necessary and removes unnecessary portion by masking. The CMYK image data is compressed. The initially compressed data and separate signals from a separation unit 113 (see FIG. 24) are sent to a parallel bus Pb as parallel data. The parallel data is further compressed by a memory controller IMAC, and the compressed data is stored in a memory unit MEM. The memory controller IMAC controls the input and output of the image data in the parallel bus Pb and the retrieve and store of the image data in the memory unit MEM. The memory controller IMAC controls also controls code data by initially storing in a line buffer and then processes the code data on the image data based upon the process commands from a system controller 106. The processed data or the image data from the parallel bus Pb is stored in the memory unit MEM. To increase the storage efficiency, the secondarily compressed data is stored in the memory unit MEM while the addresses are maintained. To read the secondarily compressed data, the compressed data is decompressed to the initially compressed data and the separate signals that are sent to the data controller CDIC via the parallel bus Pb. The data controller CDIC in turn decompresses the initially compressed data back to the color image data. The separate signals and recorded color data are stored on a whole line basis. The separate signals are sent to the image data processing unit IPU along with respective recorded color data on a line basis.

Still referring to FIG. 23, a facsimile control unit FCU converts the image data into communication signals for an external line PN. The facsimile control unit FCU also converts the communication signals from the external line PN back to image data and outputs the image data to a printer 100 via an external I/F unit and or the parallel bus Pb. The facsimile control unit FCU further includes a FAX image processing unit, an image memory unit, a memory control unit, a facsimile transmission control unit, an image compression/decompression unit, a modem and a network control unit. The buffer function of the image data is supplemented by the memory controller unit IMAC and the memory unit MEM. When the facsimile control unit FCU starts the transmission of the image information, the facsimile transmission control unit demands the memory control unit to read the image information in a sequential manner. The FAX image processing unit restores the sequentially read image information and performs the density conversion process as well as the variable size process. The processed image data is placed in the facsimile transmission control unit and is compressed by the compression unit. After being modulated by the modem, the network unit sends the signal to a destination. Upon completing the transmission, the image information is removed from the image memory unit. The received image data is temporarily stored in the image memory unit in the facsimile control unit FCU. If it is possible to output the received image, the received image is outputted upon receiving a predetermined amount of an output unit such as a page.

The data controller CDIC further performs the conversion between the parallel data via the parallel bus Pb and the serial data via a serial bus Sb. A system controller 106 sends the data to the parallel bus Pb, while a process controller 101 sends the data to the serial bus Sb. For the communication between the system controller 106 and the system controller 101, the data controller CDIC performs the parallel/serial conversions. The data controller CDIC also sends the serial data to the IPU. In relation to the RGB image data and the YMCK image data, the data controller CDIC transmits data and control signals between the process controller 101 and the color printer 100 for image formation processes, between the system controller 106 and the color scanner 10 and between the image processing unit IPU and the parallel bus Pb. The system controller 106 and the process controller 101 communicate with each other via the parallel bus Pb, the CDIC or the serial bus Sb. The data controller CDIC performs the data format conversion for the data interface between the parallel bus Pb and the serial bus Sb. As described above, the image processing unit IPU determines an image area in the RGB image data from the color scanner 10. The RGB image data is converted into the record color CMYK image data. The CMYK image data is initially compressed, and the compressed data and the separate signals are transmitted via the parallel bus Pb through the data controller CDIC. The memory controller IMAC compresses the initially compressed data into the secondarily compressed before storing it into the memory unit MEM. The secondarily compressed data is read from the memory unit MEM and is decompressed before outputting it to the image processing unit or the facsimile control unit FCU via the parallel bus Pb. The data controller CDIC performs a first job for reusing the CMYK image data or separate signals that are stored in the memory unit MEM. The data controller CDIC also performs a second job for correcting/convertintg the CMYK image data to color output data CpMpYpKp based upon the separate signal in the image processing unit IPU and printing the color output data. An exemplary situation involving the memory unit is multiple duplication of a single document. The scanner 10 is operated for one time, and the data is stored in the memory unit MEM. The stored data is read for a number of times. An exemplary situation not involving the memory unit is a single duplication of the document. The image processing unit IPU converts the CMYK image data into the color output data CpMpYpKp, and no data is stored.

According to the above described data flow, a digital copier performs a plurality of functions based upon the read/write data control operations on the memory controller IMAC, the memory unit MEM or the parallel bus Pb as well as the bus control operations among the data controller CDIC, the image processing unit IPU and the parallel bus Pb. For example, one of the multi functions is facsimile transmission includes the correction of the RGB image data from the color document scanner 10 by the image processing unit IPU, the conversion of the corrected RGB data into the YMCK image data as necessary, and the transmission of the image data to the facsimile control unit FCU via the data controller CDIC and the parallel bus Pb. The facsimile control unit FCU further converts the image data to the communication signal for the public communication line PN and transmits the communication signal to the public communication line PN. Contrarily, the facsimile reception function includes the conversion of the communication signal from the public communication line PN to the image data for the facsimile control unit FCU and the transmission of the converted image data to the image processing unit IPU via the data controller CDIC and the parallel bus Pb. If the received data is the RGB image data, the image processing unit IPU converts the RGB data into the YMCK data. On the other hand, if the received data is the YMCK data, the image processing unit IPU transmits the YMCK data to the printer 100 for the image formation process without any intermediate process. During the multi-tasking process of a plurality of job such as a copying function, a fax transmission/reception function and or a printing function, the system controller 106 and the process controller 101 controls the usage rights or the priority of the color document scanner 10, the color printer 100, the parallel bus Pb and the image processing unit IPU. The process controller 101 controls the flow of the image data while the system controller 106 control the system as a whole including the activation of the resources. The functional selection of the digital color multi function copier is inputted through a control board 20, and the multi function includes a copier function and a fax function. The printer output function is activated by a print command in a personal computer PC.

Figure 24:
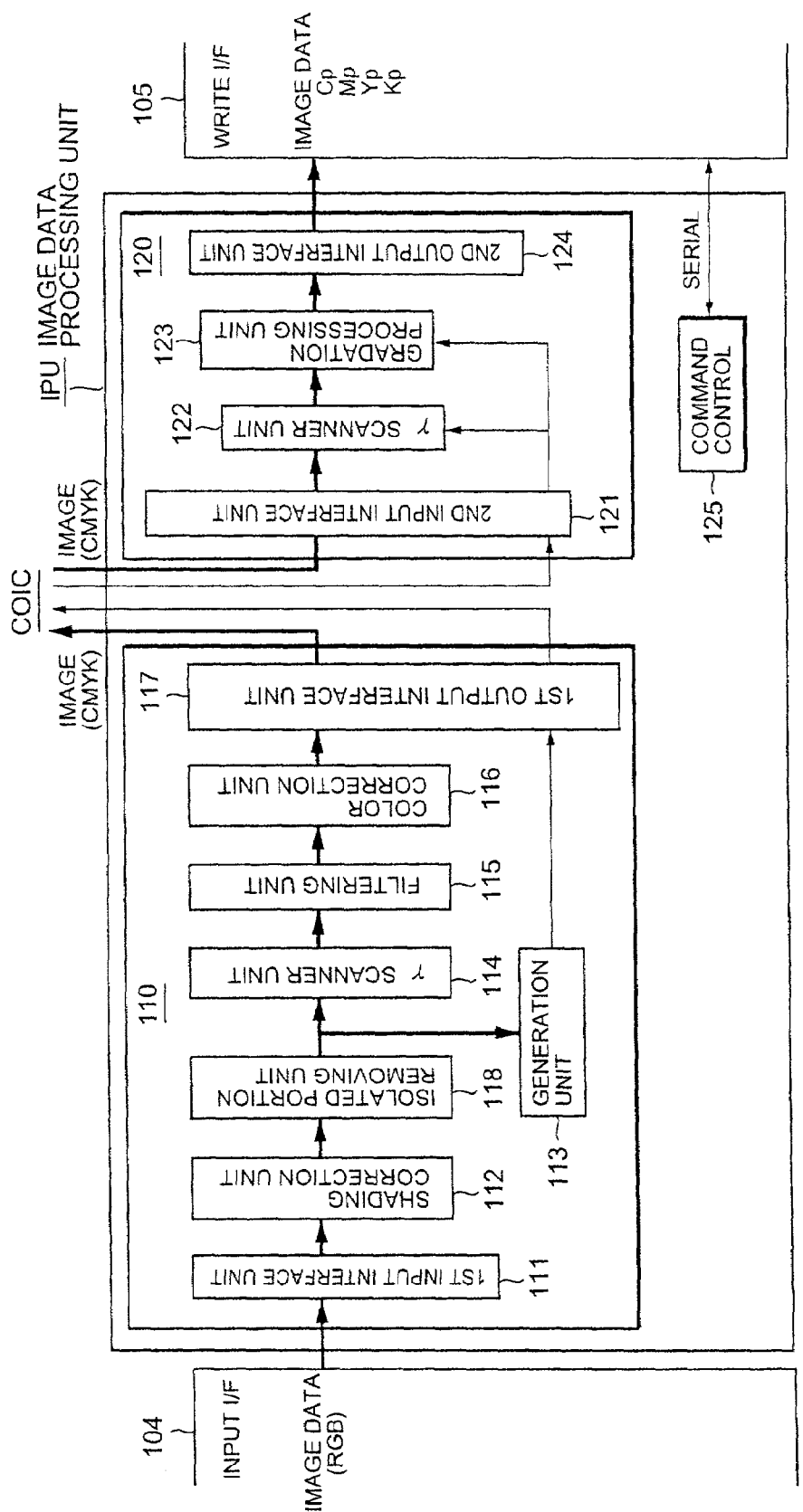
FIG. 24 is a diagram illustrating data processing functions of the image processing unit IPU of the preferred embodiment according to the current invention.

Now referring to FIG. 24, a diagram illustrates data processing functions of the image processing unit IPU of the preferred embodiment according to the current invention. The image processing unit IPU performs a predetermined set of corrective processes on the input RGB image data. The corrective processes include a shading correction process 112, an isolated portion removal process 118, a scanner γ conversion process 114 and a filter process 115. The color correction process 116 converts the RGB image data into the recording color CMYK image data which includes 8 bits per color. The separation process 113 determines and separates binary regions such as text and lines from non-binary regions such as pictures in the RGB image data. The determined results form the above separation process 113 are stored in a one-bit separation signal. The separation signal and the CMYK image data are transmitted to the data controller CDIC. Based upon the separation signal, the output correction is performed for improving the image quality of the recording color data. The output correction includes a printer γ conversion process 122 and a gradation process 123 to generate the binary print output data Cp, Mp, Yp and Kp. The gradation process 123 is mainly an area approximation and further includes an intensity gradation, dithering and error distribution. Based upon the separation signal and image process mode, the image process is accordingly performed. The binary print out data Cp, Mp, Yp and Kp are separately written to a buffer memory of the write I/F 105 for the four drum units of the color printer 100. Based upon the positional difference of the four drums, the print out data is separately read and sent to a corresponding laser modulator of the optical writing unit 2 of the color printer 100. That is, in the color printer 100, the binary image data Cp, Mp, Yp and Kp is provided to the laser modulator to generate the binary static image on the photoreceptor drums 211C, 211M, 211Y and 211K.

Referring to FIG. 25, diagrams illustrate certain aspects of a preferred process of removing isolated portions in the information processing unit IPU according to the current invention. In general, the RGB intensity level data from the color document scanner 10 via the input I/F 104 is represented by 8-bit data ranging from 0 through 255, which is the highest. If an isolated portion exists, the G image data that corresponds to the isolated portion is converted to a predetermined pixel value level that represents an after-removal value. Similarly, the corresponding portions of the R image data and the B image data are also converted to the predetermined after-removal pixel value. The predetermined after-removal pixel value is optionally set to a background value. Furthermore, the background value is automatically detected prior to the above assignment. The image processing unit IPU performs the isolated portion removal process 118 and is optionally implemented as an application specific IC or ASIC. An input and output buffer memory unit includes a 5×7 rectangular block Mat for the G image data specific 5-line input image memory ME a and three sets of 5-line output image memory units ME b for storing image data after the isolation portion removal respectively for the R, G and B data.

Figure 25A:
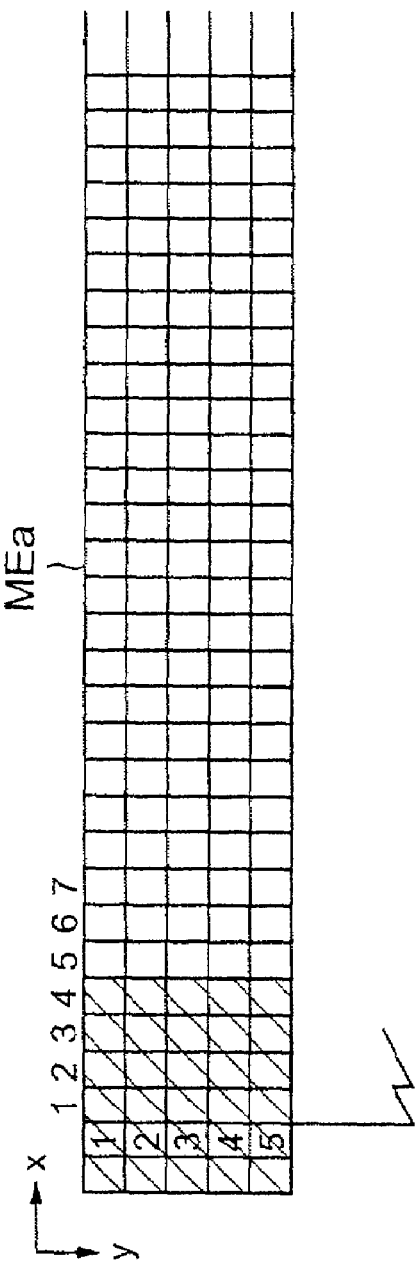
FIGS. 25A and 25B are diagrams illustrating how image data is distributed in memory units according to the current invention.
Figure 25B:
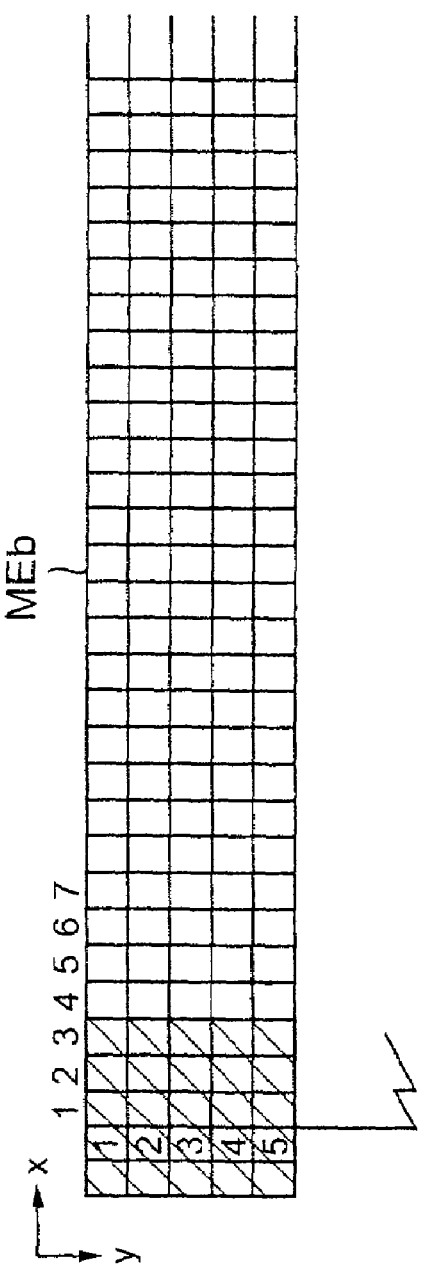

Now referring to FIGS. 25A and 25B, diagrams illustrate how image data is distributed in memory units according to the current invention. FIG. 25A illustrates a content of 5-line input image memory ME a while FIG. 25B illustrates a content of 5-line output image memory ME b. 8-bit pixel data is represented by a single square, and the distribution of the pixel data is illustrated in both x and y directions. The pixel group in the x direction is a row while that in the y direction is a column. From the image data for the isolated portion removal process, the 5-line of the G image data is written to the input image memory ME a. Similarly, a respective 5-line of the RGB image data is written to the output image memory ME b. To remove an isolated portion from a line of pixels, the image processing unit IPU designates a pixel at y=3 or the third row and x=1 or the first column as a current pixel in the memory ME a. Based upon the current pixel, a 5×7 rectangular block or window Mat is specified as shown in a shaded area in FIG. 25A.

Figure 26:
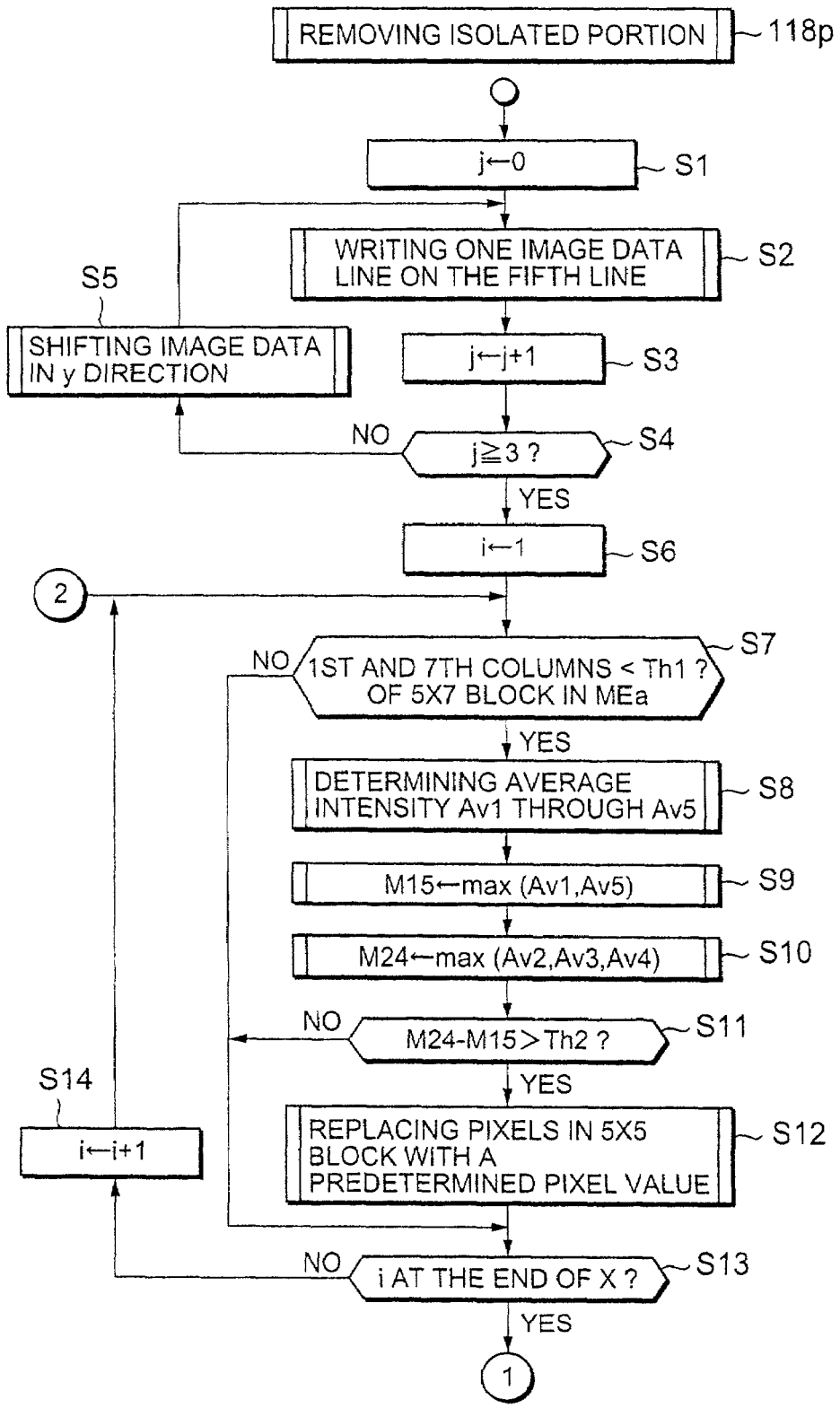
FIGS. 26 and 27 are a flow chart illustrating steps involved in a preferred process of removing isolated portions from image data according to the current invention.
Figure 27:
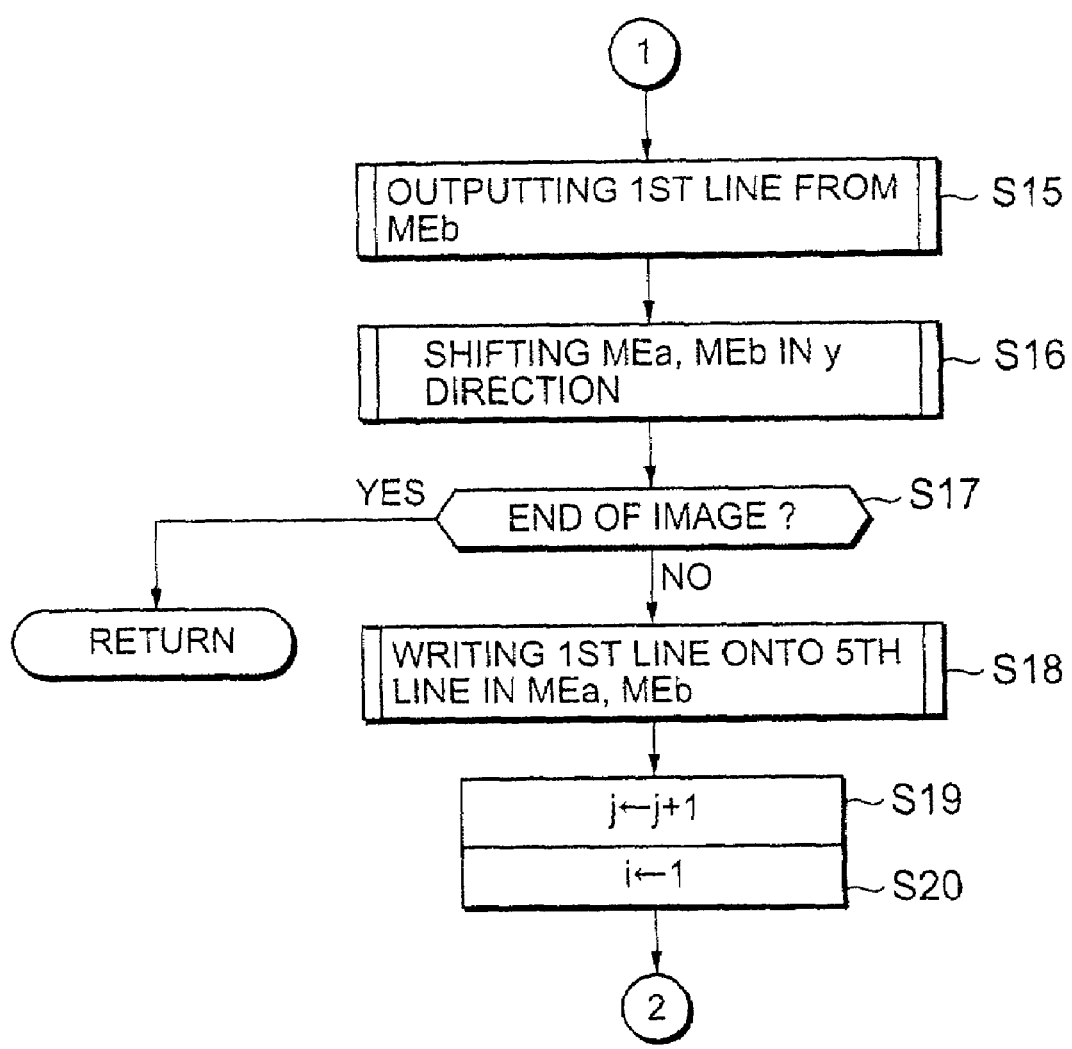
Figure 28A:
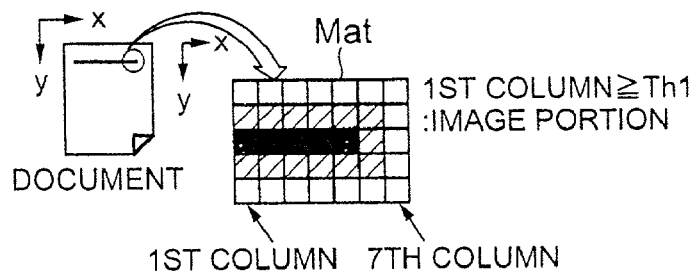
FIG. 28 is specific examples illustrating the step 7 of the above preferred process as described with respect to FIG. 26 according to the current invention.
Figure 28B:
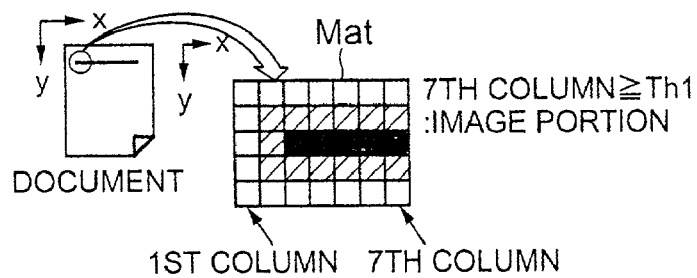
Figure 28C:
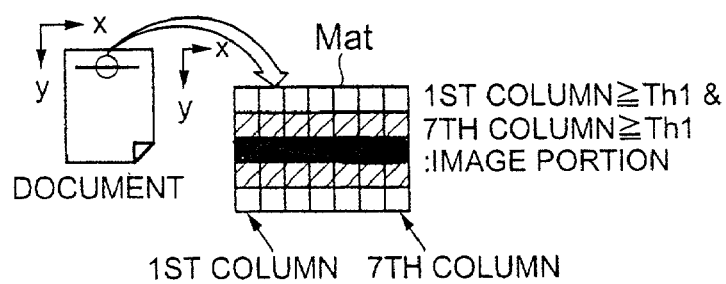
Figure 28D:
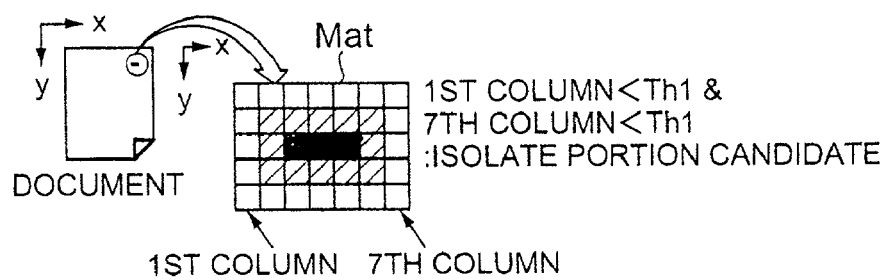
Figure 29A:
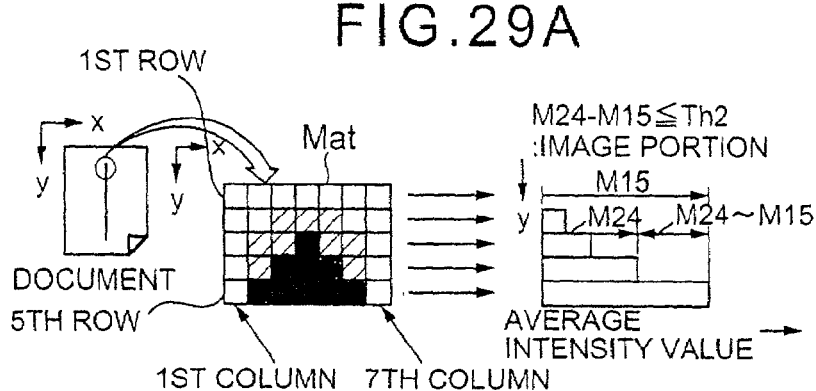
FIG. 29 is specific examples illustrating the step 11 of the above preferred process as described with respect to FIG. 27 according to the current invention.
Figure 29B:
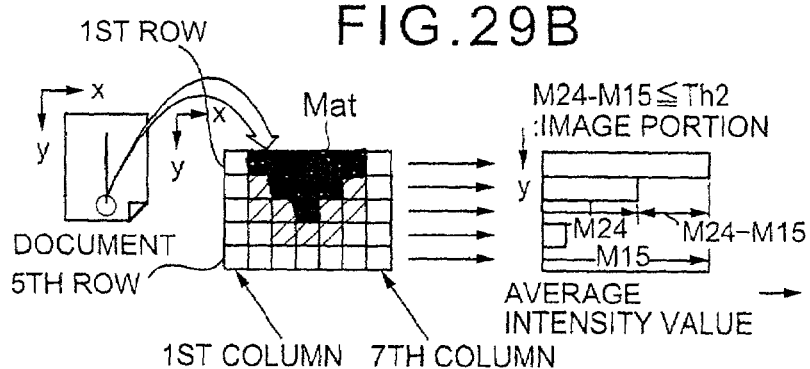
Figure 29C:
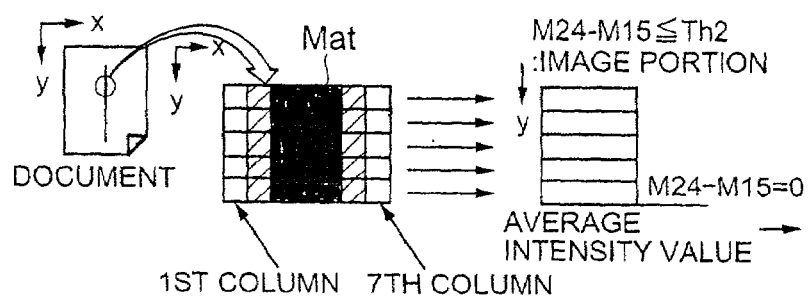
Figure 29D:
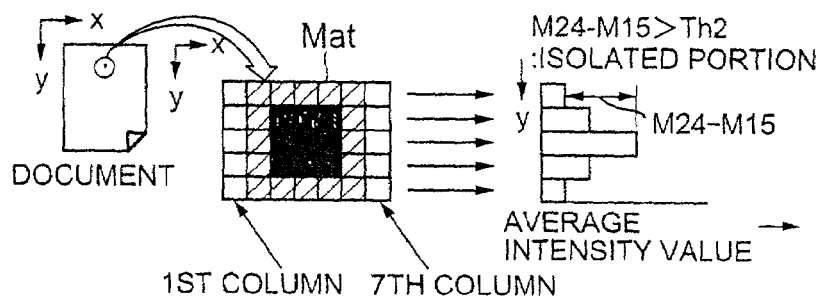

Now referring to FIGS. 26 and 27, a flow chart illustrates steps involved in a preferred process of removing isolated portions from image data according to the current invention. The image processing unit IPU receives an instruction from the process controller 101 to start the preferred process before the image processing unit IPU receives the document image data from the scanner 10. In response to the instruction, the image processing unit IPU initializes the input and output memory units ME a and ME b in addition to a register j for storing the image data of an image data line j in a step S1. Upon receiving a first line of image data from the scanner 10, the image processing unit IPU writes the received image data in the fifth line of the memory units ME a and ME b in a step S2. The jth line or row counter for the line j is incremented by one in a step S3. If it is determined that the jth counter is not equal to or larger than 3 in a step S4, the preferred process proceeds to a step S5. In the step S5, the data is shifted in the y direction. In other words, in the memory units ME a and ME b, a second line of the image data is written on a first line. Similarly, a third line of the image data is written on a second line while a fourth line of the image data is written on a third line in the memory units ME a and ME b. After the step 5, the preferred process returns to the second step S2 where a next line of the image data from the scanner 10 is written to the fifth line of the memory units ME a and ME b. After repeating the above steps and when the j counter is incremented to 3, the image processing unit IPU performs predetermined isolated portion removal steps on sets of data. Each of the sets of the data is sequentially processed and has a current pixel that is positioned on a third row or y=3. That is, when it is determined that the jth counter is at least 3 in the S4, an ith counter or column counter is initialized to 1 to focus on a first pixel as a current pixel in a step S6. A 5×7 rectangular pixel block is defined with the current pixel at its center (i, 3) as well as five rows and seven columns of pixels. In a step 7, it is determined whether or not every pixel in the first and seventh columns of the rectangular block has a pixel value that is lower than a predetermined first threshold value Th1. If it is determined that every pixel in the first and seventh columns has a pixel value that is lower than the first threshold value Th1, the current pixel is considered as a potential isolated portion or an isolated portion candidate. On the other hand, if any of the pixels in the first or seventh column is equal to or above the first threshold value Th1 in the step S7, the current pixel is considered to be a non-isolated portion. In case of the non-isolated portion, the preferred process proceeds to a step S13 where it is checked whether or not the current pixel is at the end of a current row. If not, the ith counter is incremented by one to shift the current pixel in the x direction in a step S14 and the preferred process repeats the step S7.

Still referring to FIG. 26, in case of the potential isolated portion, the image processing unit IPU determines an average row pixel value Av1 through Av5 for each of the first through fifth rows of the current 5×7 pixel block in a step S8. Subsequently, in a step S9, the higher of the average pixel values Av1 and Av5 is selected, and the selected value is designated as a block directional representative value M15. Similarly, the highest of the average pixel values Av2 through Av4 is selected, and the selected value is designated as an internal block representative value M24 in a step S10. Furthermore, it is determined in a step S11 whether or not the difference (M24−M15) between the above two representative values M15 and M24 is larger than a predetermined second threshold value Th2. If it is determined in the step S11 that the difference M24−M15 is not larger than the second threshold Th2, it is also concluded that the current pixel is not an isolated portion. Consequently, the preferred process proceeds to the step S13. On the other hand, if it is determined in the step S11 that the difference M24−M15 is larger than the second threshold Th2, it is also concluded that the current pixel is an isolated portion. As a result of the above determination for an isolated portion, a 5×5 pixel block is focused in the memory unit ME b, and the current pixel is located at center of the 5×5 pixel block. Every pixel value for the R, G and B values in the above pixel block is replaced with a predetermined lowest or background value such as "0" in a step S12. When the above described steps are completed and the ith counter indicates that the last pixel in the current row has been processed as a current pixel in a step S13, the preferred process proceeds to a step S15 via a circled position 1 as shown in FIG. 27.

Now referring to FIG. 27, a flow chart illustrates continuing steps involved in the above preferred process of removing isolated portions from image data as partially shown in FIG. 26 according to the current invention. In the step S15, the image processing unit IPU outputs the first row of data at y=1 in the memory unit ME b to the scanner γ conversion 114 and the separation 113 as shown in FIG. 24 after every pixel in the row has been processed as a current pixel in the isolated portion removal process. When j=3, the above output data is not the first line of the input image data for an original image. The above output data at j=3 is a row of dummy data prior to the real data for the scanner γ conversion 114 and the separation 113. The image processing unit IPU shifts one line of data in the memory units ME a and ME b in the y direction in a step S16 and waits for the scanner 10 to send one line of the image data. If the end of the image data has been reached in a step S17, the preferred process terminates the above described isolated portion process and returns to its calling process. On the other hand, if the end of the image data has not been reached in a step S17, the image processing unit IPU stores the one line of the image data into the fifth line of the memory units ME a and ME b upon receiving it from the scanner 10 in a step S18. Subsequently, the jth counter is incremented by one to indicate the current row in a step S19. Similarly, the ith counter is initialized to 1 to indicate the beginning pixel of the row in a step S20. The preferred process returns to the step S7 via a circled point 2 in FIG. 26 for repeating the above steps 7 through 20 to detect and remove the isolated portion. When the jth counter is five, the output data from the y=1 line at the memory unit ME b is the first line of the input image data after the isolated portion has been removed. The image processing unit IPU repeats the above described steps 7 through 20 until the scanner 10 finishes transmitting the image data of an entire document page. After all of the isolated portions have been removed from the image data, the above steps 15 and 16 are repeated until the last image data is outputted from the memory unit ME b at y=1. In an alternative embodiment, the running direction x and the sub-running direction y are switched. In addition, in an alternative embodiment, the rows and columns are also switched.

Now referring to FIG. 28, diagrams are specific examples illustrating the step 7 of the above preferred process as described with respect to FIG. 26 according to the current invention. As described above, it is determined in the step 7 whether or not every pixel in the first and seventh columns of the rectangular block has a pixel value that is lower than a predetermined first threshold value Th1. FIG. 28A illustrates that the pixel block contains a horizontal line whose left end crosses the first column while whose right end fails to cross the seventh column. Since the first column contains some dark pixels of the crossing line, the test in the step 7 fails and the current pixel is considered to be a part of an image rather than an isolated portion candidate. Similarly, FIG. 28B illustrates that the pixel block contains a horizontal line whose left end fails to cross the first column and whose right end crosses the seventh column. Since the seventh column contains some dark pixels of the crossing line, the test in the step 7 fails and the current pixel is considered to be a part of an image rather than an isolated portion candidate. FIG. 28C illustrates that the pixel block contains a horizontal line whose left and right ends cross the first and seventh columns. Since the first and seventh columns contain some dark pixels of the crossing line, the test in the step 7 fails and the current pixel is considered to be a part of an image rather than an isolated portion candidate. In contrast, FIG. 28D illustrates that the pixel block contains a horizontal line whose left and right ends both fail to cross the first and seventh columns. Since the first and seventh columns both contain no dark pixels of the crossing line, the test in the step 7 fails and the current pixel is considered to be an isolated portion candidate.

Now referring to FIG. 29, diagrams are specific examples illustrating the step 11 of the above preferred process as described with respect to FIG. 27 according to the current invention. As described above, it is determined in the step 11 whether or not the difference (M24–M15) between the above two representative values M15 and M24 is larger than a predetermined second threshold value Th2. FIG. 29A illustrates that the block directional representative value M15 is the average value of the fifth row while the internal block representative value M24 is the average value of the fourth row. The difference (M24–M15) is a negative number and is smaller than the second threshold value Th2. Based upon the test in the step 11, the current pixel is considered to be an image part rather than an isolated portion candidate. Similarly, FIG. 29B illustrates that the block directional representative value M15 is the average value of the first row while the internal block representative value M24 is the average value of the second row. The difference (M24–M15) is a negative number and is smaller than the second threshold value Th2. Based upon the test in the step 11, the current pixel is considered to be an image part rather than an isolated portion candidate. FIG. 29C illustrates that the block directional representative value M15 is the average value of either the first or fifth row while the internal block representative value M24 is the average value of any of the second through fourth rows. The difference (M24–M15) is zero and is smaller than the second threshold value Th2. Based upon the test in the step 11, the current pixel is considered to be an image part rather than an isolated portion candidate. In contrast, FIG. 29D illustrates that the block directional representative value M15 is the average value of either the first or fifth row while the internal block representative value M24 is the average value of the third row. The difference (M24–M15) is a positive and is larger than the second threshold value Th2. Based upon the test in the step 11, the current pixel is considered to be an isolated portion candidate.

In another preferred embodiment, the hardware is substantially identical to above described hardware as described with respect to FIGS. 21 through 24. However, in the current preferred embodiment, the image processing unit IPU performs steps that are slightly different from those in the isolated portion removal process 118. The pixel block in the current preferred embodiment is rotated by 90 degrees from that of the previous embodiment. The pixel block in the current preferred embodiment is 7 rows×5 columns as opposed to 5 rows×7 columns. Furthermore, a single row rather two columns is initially compared to a predetermined first threshold value Th1. To conclude whether or not the current pixel is an isolated portion candidate, a number of pixels is initially determined in the 6th row that has a pixel value lower than the predetermined first threshold value Th1. If the above determined number of the pixels in the 6th row is equal to or above a predetermined second threshold value, the current pixel is considered to be an isolated portion candidate. On the other hand, if the above determined number of the pixels in the 6th row is below the predetermined second threshold value, the current pixel is not considered to be an isolated portion candidate. Alternatively, in the above first threshold value comparison, the second threshold value Th2 is set to a maximal number of pixels in the 6th row. That is, if there is even a single pixel in the 6th row that has a pixel value higher than the predetermined first threshold value Th1, the current pixel is considered to be an isolated portion. Similarly, in stead of the 6th row, another row such as a 1st row is used. The current pixel is also optionally located at an off-center of the block.

Figure 30A:
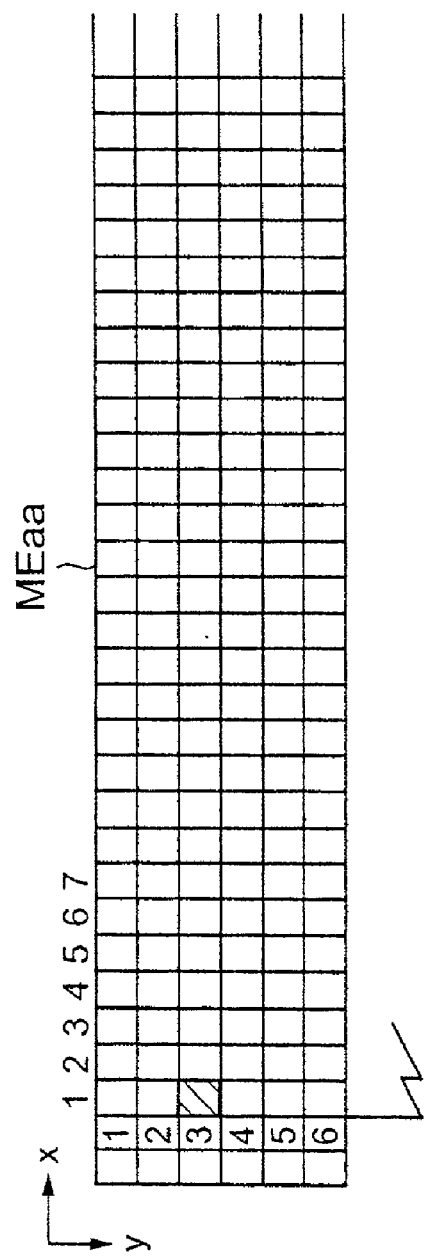
FIGS. 30A and 30B are diagrams illustrating how image data is distributed in memory units according to the current invention.
Figure 30B:
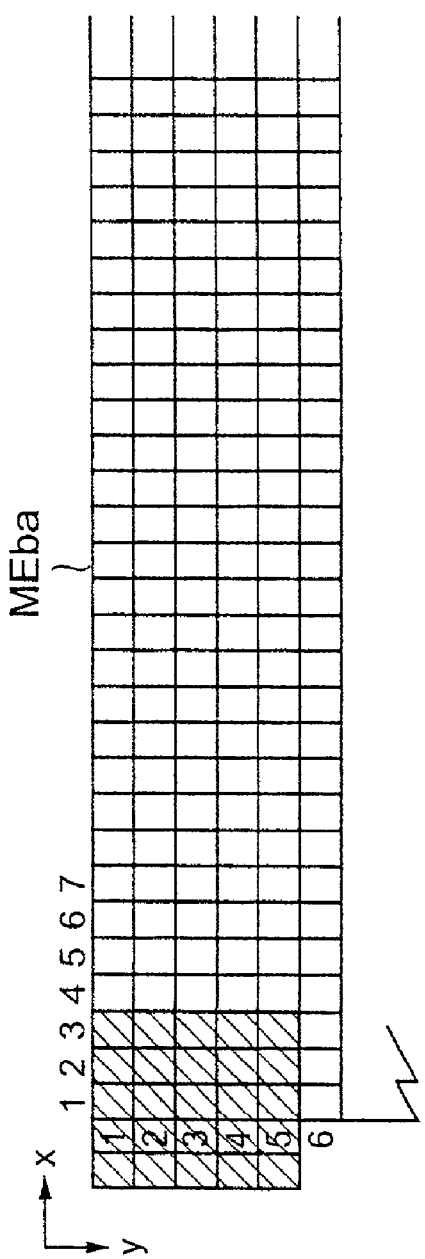

Now referring to FIGS. 30A and 30B, diagrams illustrate how image data is distributed in memory units according to the current invention. FIG. 30A illustrates a content of 6-line input image memory ME aa while FIG. 30B illustrates a content of 6-line output image memory ME ba. 8-bit pixel data is represented by a single square, and the distribution of the pixel data is illustrated in both x and y directions. The pixel group in the x direction is a row while that in the y direction is a column. From the image data for the isolated portion removal process, the 6-line of the G image data is written to the input image memory ME aa. Similarly, a respective 6-line of the RGB image data is written to the output image memory ME ba. To remove an isolated portion from a line of pixels, the image processing unit IPU designates a pixel at y=3 or the third row and x=1 or the first column as a current pixel in the memory ME aa. Based upon the current pixel, a 6×5 rectangular block or window Mat is specified as shown in FIG. 30A.

Figure 32:
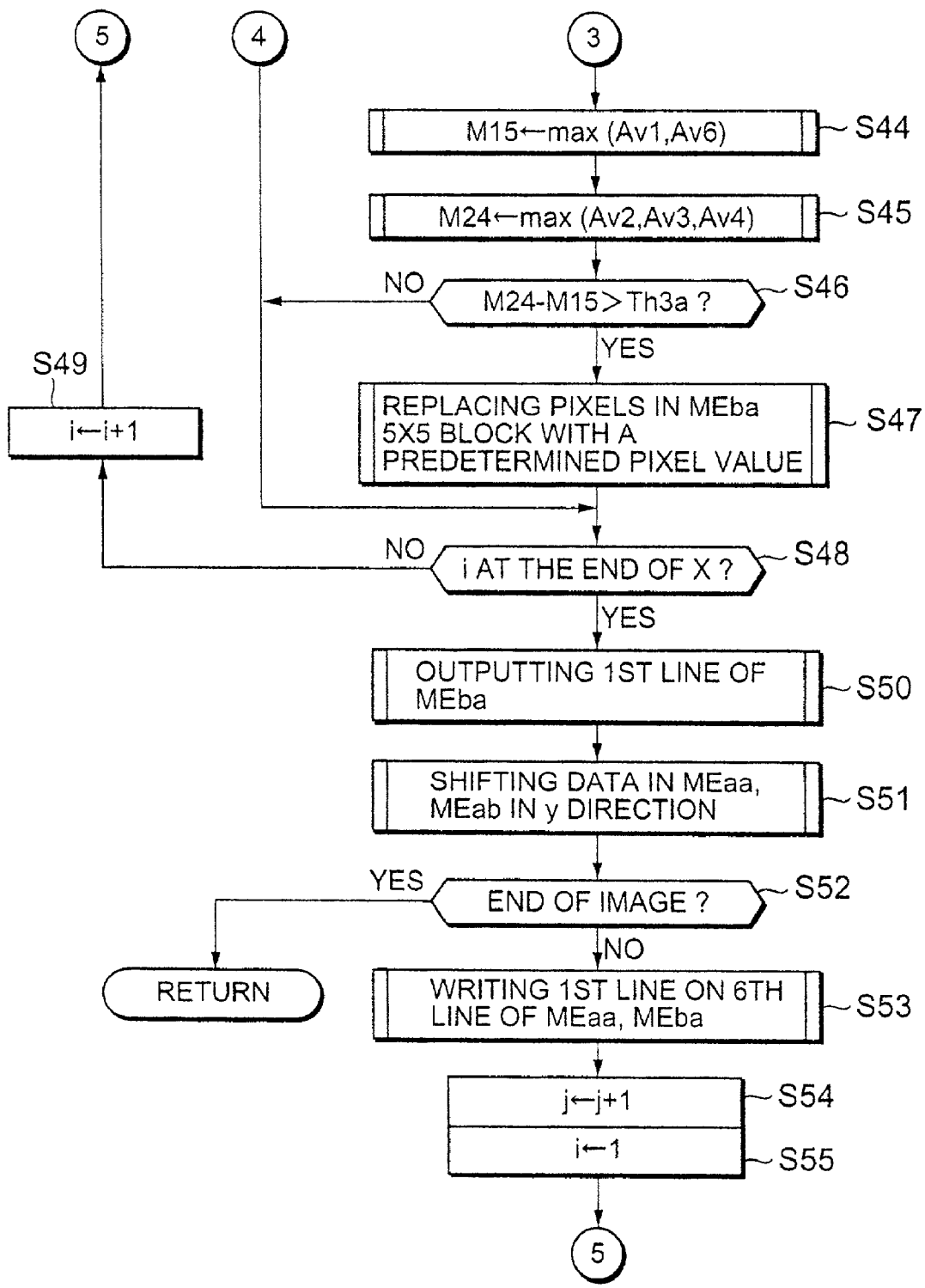
Figure 33A:
FIG. 33 is specific examples illustrating the steps 38 through 42 of the above preferred process as described with respect to FIG. 31 according to the current invention.
Figure 33B:
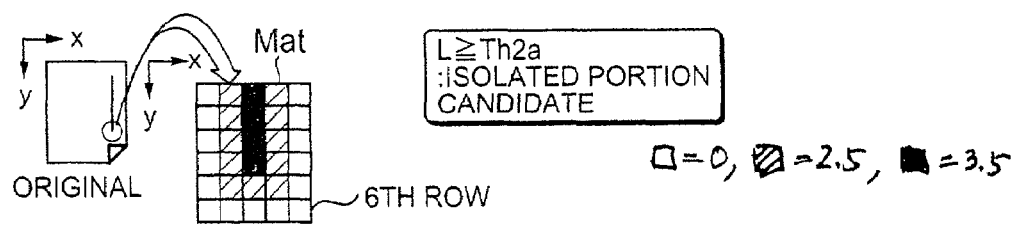
Figure 33C:
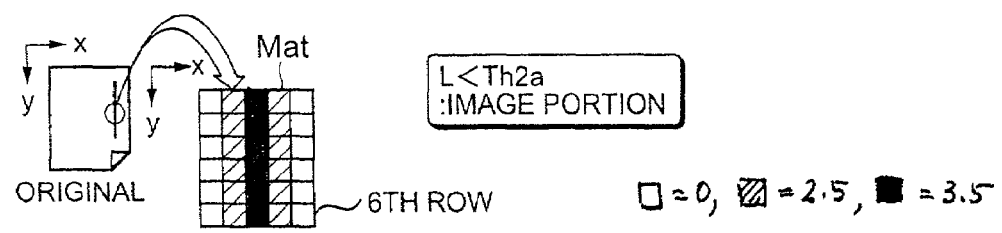
Figure 33D:
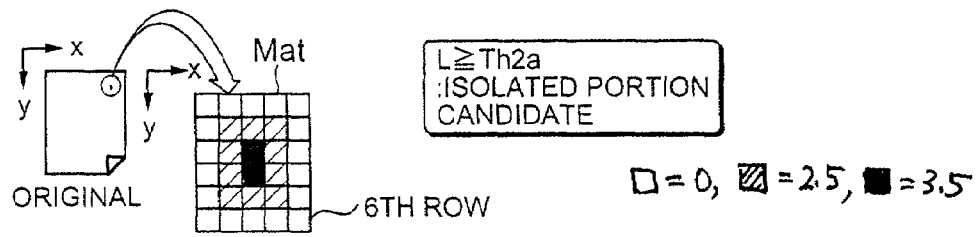
Figure 34A:
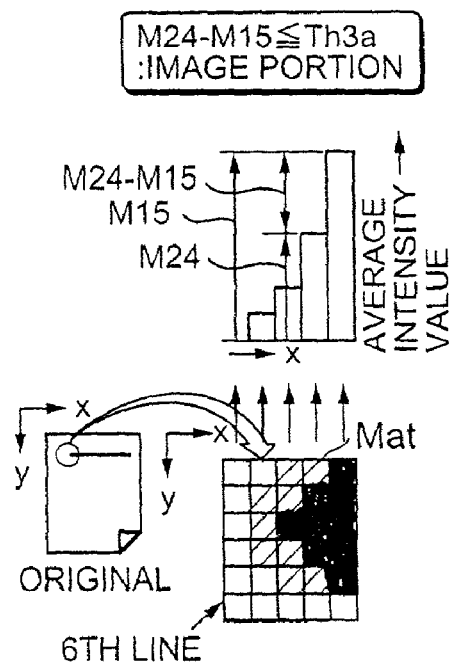
FIG. 34 is specific examples illustrating the step 46 of the above second preferred process as described with respect to FIG. 32 according to the current invention.
Figure 34B:
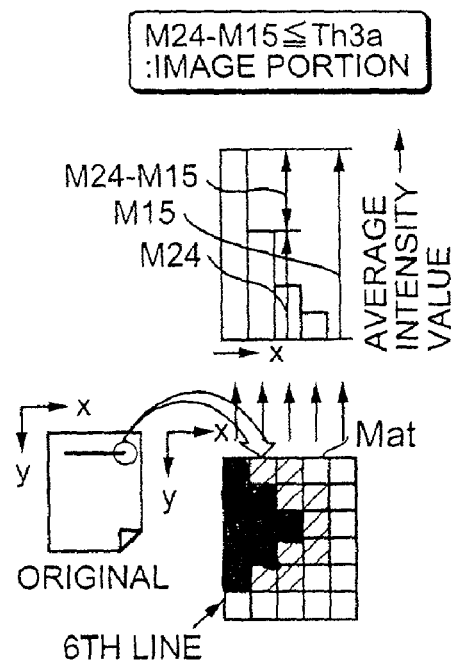
Figure 34C:
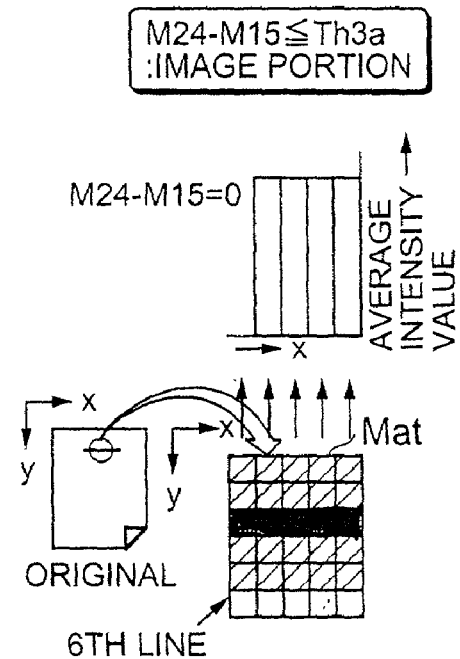
Figure 34D:
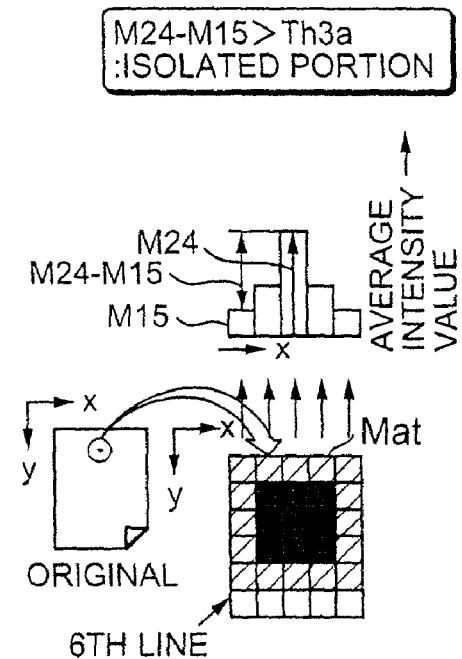

Now referring to FIGS. 31 and 32, a flow chart illustrates steps involved in a second preferred process of removing isolated portions from image data according to the current invention. The image processing unit IPU receives an instruction from the process controller 101 to start the preferred process before the image processing unit IPU receives the document image data from the scanner 10. In response to the instruction, the image processing unit IPU initializes the input and output memory units ME aa and ME ba in addition to a register j for storing the image data of an image data line j in a step S31. Upon receiving a first line of image data from the scanner 10, the image processing unit IPU writes the received image data in the sixth line of the memory units ME aa and ME ba in a step S32. The jth line or row counter for the line j is incremented by one in a step S33. If it is determined that the jth counter is not equal to or larger than 4 in a step S34, the preferred process proceeds to a step S35. In the step S35, the data is shifted in the y direction. In other words, in the memory units ME aa and ME ba, a second line of the image data is written on a first line. Similarly, a third line of the image data is written on a second line while a fourth line of the image data is written on a third line in the memory units ME aa and ME ba. After the step 35, the preferred process returns to the second step S32 where a next line of the image data from the scanner 10 is written to the sixth line of the memory units ME aa and ME ba. After repeating the above steps and when the jth counter is incremented to 4, the image processing unit IPU performs predetermined isolated portion removal steps on sets of data. Each of the sets of the data is sequentially processed and has a current pixel that is positioned on a third row or y=3. That is, when it is determined that the jth counter is at least 3 in the S34, an ith counter or column counter is initialized to 1 to focus on a first pixel as a current pixel in a step S36. A 6×5 rectangular pixel block is defined with the current pixel at its center (3, 3) as well as six rows and five columns of pixels. In a step 37, a pixel position counter k is initialized to 1 while a pixel number counter L is initialized to 0. In a step 38, it is determined whether or not a pixel value at kth column position on the sixth row in the memory unit ME aa is lower than a predetermined first threshold value Th1a. If it is determined that the kth pixel has a pixel value that is lower than the first threshold value Th1a, the pixel counter L is incremented by one in a step 39. On the other hand, if the kth pixel value is equal to or above the first threshold value Th1a in the step S38, the second preferred process skips the step 39 and proceeds to a step 40, where the kth column counter value is compared to a predetermined value of 5. If the current column position is not equal to or larger than 5, the kth column counter is incremented by one in a step 41 and the second preferred process returns to the step 38. In case of the kth counter being at least 5, it is further determined in a step 42 whether or not the pixel number counter L is equal to or larger than a predetermined second threshold value Th2a. If the pixel counter L contains a number that is not equal to or larger than the second threshold value Th2a, the current pixel is considered to be a non-isolated portion. In case of the non-isolated portion, the preferred process proceeds to a step S48 via a circled position 4 in FIG. 32 where it is checked whether or not the current pixel is at the end of a current row. If the current pixel is not at the end of the row, the ith counter is incremented by one to shift the current pixel in the x direction in a step S49 and the preferred process repeats the step S37. In case of the potential isolated portion as determined in the step 42, the image processing unit IPU determines an average row pixel value Av1 through Av5 for each of the first through fifth columns of the current 5×5 pixel block in a step S43.

Now referring to FIG. 32, a flow chart illustrates continuing steps involved in the above preferred process of removing isolated portions from image data as partially shown in FIG. 31 according to the current invention. In a step S44, the higher of the average pixel values Av1 and Av5 is selected, and the selected value is designated as a block directional representative value M15. Similarly, the highest of the average pixel values Av2 through Av4 is selected, and the selected value is designated as an internal block representative value M24 in a step S45. Furthermore, it is determined in a step S46 whether or not the difference (M24−M15) between the above two representative values M15 and M24 is larger than a predetermined third threshold value Th3. If it is determined in the step S46 that the difference M24−M15 is not larger than the third threshold Th3, it is concluded that the current pixel is not an isolated portion. Consequently, the preferred process proceeds to a step S48. On the other hand, if it is determined in the step S45 that the difference M24−M15 is larger than the third threshold Th3, it is concluded that the current pixel is an isolated portion. As a result of the above determination for an isolated portion, a 5×5 pixel block is focused in the memory unit ME ba, and the current pixel is located at center of the 5×5 pixel block. Every pixel value for the R, G and B values in the above pixel block is replaced with a predetermined lowest or background value such as "0" in a step S47. When the above described steps are completed and the ith counter indicates that the last pixel in the current row has been processed as a current pixel in a step S48, the preferred process proceeds to a step S50. When the ith counter indicates that the last pixel in the current row has not yet been processed as a current pixel in the step S48, the ith counter is incremented in a step S49 and the preferred process returns to the step S37 in FIG. 31 via a circle position 5.

Still referring to FIG. 32, in the step S50, the image processing unit IPU outputs the first row of data at y=1 in the memory unit ME ba to the scanner γ conversion 114 and the separation 113 as shown in FIG. 24 after every pixel in the row has been processed as a current pixel in the isolated portion removal process. When j=4, the above output data is not the first line of the input image data for an original image. The above output data at j=4 is a row of dummy data prior to the real data for the scanner γ conversion 114 and the separation 113. The image processing unit IPU shifts one line of data in the memory units ME aa and ME ba in the y direction in a step S51 and waits for the scanner 10 to send one line of the image data. If the end of the image data has been reached in a step S52, the second preferred process terminates the above described isolated portion process and returns to its calling process. On the other hand, if the end of the image data has not been reached in a step S52, the image processing unit IPU stores the one line of the image data into the fifth line of the memory units ME aa and ME ba upon receiving it from the scanner 10 in a step S53. Subsequently, the jth counter is incremented by one to indicate the current row in a step S54. Similarly, the ith counter is initialized to 1 to indicate the beginning pixel of the row in a step S55. The preferred process returns to the step S37 via a circled point 5 in FIG. 31 for repeating the above steps 37 through 49 to detect and remove the isolated portion. When the jth counter is six, the output data from the y=1 line at the memory unit ME ba is the first line of the input image data after the isolated portion has been removed. The image processing unit IPU repeats the above described steps 37 through 55 until the scanner 10 finishes transmitting the image data of an entire document page. After all of the isolated portions have been removed from the image data, the above steps 50 and 51 are repeated until the last image data is outputted from the memory unit ME ba at y=1. In an alternative embodiment, the running direction x and the sub-running direction y are switched. In addition, in an alternative embodiment, the rows and columns are also switched.

Now referring to FIG. 33, diagrams are specific examples illustrating the steps 38 through 42 of the above preferred process as described with respect to FIG. 31 according to the current invention. As described above, it is determined in the steps 38 through 42 whether or not a number of pixels in the sixth row of the rectangular block whose pixel value is lower than the predetermined first threshold value Th1a is larger than the predetermined second value Th2a. For the following examples in FIGS. 33a through 33D, assume that a darkest square, a shaded square and a blank square respectively represent a pixel value of 3.5, 2.5 and 0. FIG. 33A illustrates that the pixel block contains a vertical line whose bottom end crosses the sixth row while whose top end fails to cross the first row. Assuming that the predetermined first and second threshold values Th1a=2 and Th2a=3, since the sixth row contains only two pixels that are below the first threshold value (L=2), the test in the step 42 fails and the current pixel is considered to be a part of an image rather than an isolated portion candidate. Similarly, FIG. 33AC illustrates that the pixel block contains a vertical line whose top and bottom ends respectively cross the first and sixth rows. Assuming that the predetermined first and second threshold values Th1a=2 and Th2a=3, since the sixth row contains only two pixels that are below the first threshold value (L=2), the test in the step 42 fails and the current pixel is considered to be a part of an image rather than an isolated portion candidate. On the other hand, FIG. 33B illustrates that the pixel block contains a vertical line whose top end crosses the first row while whose bottom end fails to cross the sixth row. Assuming that the predetermined first and second threshold values Th1$a$=2 and Th2$a$=3, although the sixth row contains five pixels that are below the first threshold value (L=2), the test in the step 42 falsely concludes that the current pixel is considered to an isolated portion candidate rather than an image part. The line is not an isolated portion in the rectangular block as shown in FIG. 33B. Lastly, FIG. 33B illustrates that the pixel block contains an isolated partial vertical line whose top and bottom ends fail to cross the first and sixth row. Assuming that the predetermined first and second threshold values Th1$a$=2 and Th2$a$=3, since the sixth row contains five pixels that are below the1263 first threshold value (L=2), the test in the step 42 correctly concludes that the current pixel is considered to an isolated portion candidate rather than an image part.

Now referring to FIG. 34, diagrams are specific examples illustrating the step 46 of the above second preferred process as described with respect to FIG. 32 according to the current invention. As described above, it is determined in the step 11 whether or not the difference (M24–M15) between the above two representative values M15 and M24 is larger than a predetermined third threshold value Th3$a$. FIG. 34A illustrates that the block directional representative value M15 is the average value of the fifth column while the internal block representative value M24 is the average value from the fourth column. The difference (M24–M15) is a negative number and is smaller than the third threshold value Th3$a$. Based upon the test in the step 46, the current pixel is considered to be an image part rather than an isolated portion candidate. Similarly, FIG. 34B illustrates that the block directional representative value M15 is the average value of the first column while the internal block representative value M24 is the average value from the second column. The difference (M24–M15) is a negative number and is smaller than the third threshold value Th3a. Based upon the test in the step 46, the current pixel is considered to be an image part rather than an isolated portion candidate. FIG. 34C illustrates that the block directional representative value M15 is the average value of either the first or fifth column while the internal block representative value M24 is the average value of any of the second through fourth columns. The difference (M24–M15) is zero and is smaller than the third threshold value Th3$a$. Based upon the test in the step 46, the current pixel is considered to be an image part rather than an isolated portion candidate. In contrast, FIG. 34D illustrates that the block directional representative value M15 is the average value of either the first or fifth column while the internal block representative value M24 is the average value of the third column. The difference (M24–M15) is a positive and is larger than the third threshold value Th3$a$. Based upon the test in the step 46, the current pixel is considered to be an isolated portion candidate.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of detecting isolated pixels in a predetermined unit area, comprising the steps of:
    comparing pixel values in at least one edge in a first direction in the predetermined unit area to a first predetermined threshold value to generate a first comparison result;
    determining an average pixel value for a group of pixels in a second direction in the predetermined unit area, the second direction being perpendicular to the first direction, the group of pixels including outer lines and inner lines;
    selecting a larger one of the average pixel values from the outer lines, the selected outer average pixel value being defined as Th;
    selecting a largest one of the average pixel values from the inner lines, the selected inner average pixel value being defined as Max;
    comparing (Mx–Th) to a predetermined second threshold value to generate a second comparison result; and
    detecting an isolated portion in the predetermined unit area based upon the first comparison result and the second comparison result.

2. The method of detecting isolated pixels in a predetermined unit area according to claim 1 wherein said comparing pixel values in the one edge in the first direction further comprising additional steps of:
    counting a number of the pixel values that is lower than the first predetermined threshold; and
    comparing the number of the pixel values to a predetermined pixel number threshold to generate the first comparison result.

3. The method of detecting isolated pixels in a predetermined unit area according to claim 1 wherein the pixel values are compared in a first pair of parallel edges in the first direction in the predetermined unit area to the first predetermined threshold value to generate the first comparison result.

4. The method of detecting isolated pixels in a predetermined unit area according to claim 3 further comprising additional steps of:
    comparing pixel values in a second pair of parallel edges in a second direction in the predetermined unit area to the first predetermined threshold value to generate a third comparison result; and
    detecting an isolated portion in the predetermined unit area based upon the first comparison result, the second comparison result and the third comparison result.

5. The method of detecting isolated pixels in a predetermined unit area according to claim 1 further comprising additional steps of:
    determining an average pixel value for a group of pixels in the first direction in the predetermined unit area, the group of pixels including outer lines and inner lines;
    selecting a larger one of the average pixel values from the outer lines, the selected outer average pixel value being defined as Th;
    selecting a largest one of the average pixel values from the inner lines, the selected inner average pixel value being defined as Max;
    comparing (Mx–Th) to a predetermined second threshold value to generate a third comparison result; and
    detecting an isolated portion in the predetermined unit area based upon the first comparison result, the second comparison result and the third comparison result to generate an isolated pixel detection result.

6. The method of detecting isolated pixels in a predetermined unit area according to claim 1 wherein the predetermined unit area is a rectangular area.

7. The method of detecting isolated pixels in a predetermined unit area according to claim 6 wherein the rectangular area is a five by seven pixel area.

8. The method of detecting isolated pixels in a predetermined unit area according to claim 1 further comprising an additional step of removing the isolated portion in the predetermined unit area based upon the isolated pixel detection result.

9. The method of detecting isolated pixels in a predetermined unit area according to claim 8 wherein the isolated portion includes a current pixel and surrounding pixels.

10. The method of detecting isolated pixels in a predetermined unit area according to claim 9 wherein a pixel value in the isolated portion is replaced with a predetermined value.

11. The method of detecting isolated pixels in a predetermined unit area according to claim 10 wherein the predetermined value is zero.

12. The method of detecting isolated pixels in a predetermined unit area according to claim 10 wherein the predetermined value is a background pixel color value.

13. The method of detecting isolated pixels in a predetermined unit area according to claim 1 further comprising an additional step of digitizing an original image.

14. The method of detecting isolated pixels in a predetermined unit area according to claim 13 wherein said digitizing is performed by a scanner.

15. The method of detecting isolated pixels in a predetermined unit area according to claim 6 wherein said removing is performed by a printer.

16. The method of detecting isolated pixels in a predetermined unit area according to claim 8 wherein said removing is performed by a facsimile machine.

17. A system for detecting isolated pixels in a predetermined unit area, comprising:
an input unit for inputting pixel values of the predetermined unit area;
a pixel value averaging unit for determining an average pixel value for a group of pixels in a second direction in the predetermined unit area, the second direction being perpendicular to the first direction, the group of pixels including outer lines and inner lines, said comparing unit selecting a larger one of the average pixel values from the outer lines;
a comparing unit connected to said input unit for comparing the pixel values in at least one edge in a first direction in the predetermined unit area to a first predetermined threshold value to generate a first comparison result; the selected outer average pixel value being defined as Th and selecting a largest one of the average pixel values from the inner lines, the selected inner average pixel value being defined as Max, said comparing unit comparing (Mx−Th) to a predetermined second threshold value to generate a second comparison result; and
an isolated portion detecting unit connected to said comparing unit for detecting an isolated portion in the predetermined unit area based upon the first comparison result and the second comparison result.

18. The system for detecting isolated pixels in a predetermined unit area according to claim 17 wherein said comparing unit counts a number of the pixel values that is lower than the first predetermined threshold and compares the number of the pixel values to a predetermined pixel number threshold to generate the first comparison result.

19. The system for detecting isolated pixels in a predetermined unit area according to claim 17 wherein said comparing unit compares the pixel values in a first pair of parallel edges in the first direction in the predetermined unit area to the first predetermined threshold value to generate the first comparison result.

20. The system for detecting isolated pixels in a predetermined unit area according to claim 19 wherein said comparing unit further comparing pixel values in a second pair of parallel edges in a second direction in the predetermined unit area to the first predetermined threshold value to generate a third comparison result, wherein said isolated portion detection unit detects an isolated portion in the predetermined unit area based upon the first comparison result, the second comparison result and the third comparison result.

21. The system for detecting isolated pixels in a predetermined unit area according to claim 17 wherein said pixel value averaging unit further determines an average pixel value for a group of pixels in the first direction in the predetermined unit area, the group of pixels including outer lines and inner lines, said comparing unit selecting a larger one of the average pixel values from the outer lines, the selected outer average pixel value being defined as Th, said comparing unit selecting a largest one of the average pixel values from the inner lines, the selected inner average pixel value being defined as Max, said selecting unit comparing (Mx−Th) to a predetermined second threshold value to generate a third comparison result, wherein said isolated portion detection unit detects an isolated portion in the predetermined unit area based upon the first comparison result, the second comparison result and the third comparison result to generate an isolated pixel detection result.

22. The system for detecting isolated pixels in a predetermined unit area according to claim 17 wherein the predetermined unit area is a rectangular area.

23. The system for detecting isolated pixels in a predetermined unit area according to claim 22 wherein the rectangular area is a five by seven pixel area.

24. The system for detecting isolated pixels in a predetermined unit area according to claim 17 further comprising an isolated portion removing unit connected to said isolated portion detection unit for removing the isolated portion in the predetermined unit area based upon the isolated pixel detection result.

25. The system for detecting isolated pixels in a predetermined unit area according to claim 24 wherein the isolated portion includes a current pixel and surrounding pixels.

26. The system for detecting isolated pixels in a predetermined unit area according to claim 25 wherein a pixel value in the isolated portion is replaced with a predetermined value.

27. The system for detecting isolated pixels in a predetermined unit area according to claim 26 wherein the predetermined value is zero.

28. The system for detecting isolated pixels in a predetermined unit area according to claim 26 wherein the predetermined value is a background pixel color value.

29. The system for detecting isolated pixels in a predetermined unit area according to claim 17 further comprising a scanner connected to said input unit for digitizing an original image.

30. The system for detecting isolated pixels in a predetermined unit area according to claim 24 wherein said isolated portion removing unit includes a printer.

31. The system for detecting isolated pixels in a predetermined unit area according to claim 24 wherein said isolated portion removing unit includes a facsimile machine.

32. A software storage medium for storing a computer readable program containing computer instructions for detecting isolated pixels in a predetermined unit area, the computer instructions performing the tasks of:

comparing pixel values in a first pair of parallel edges in a first direction in the predetermined unit area to a first predetermined threshold value to generate a first comparison result;

determining an average pixel value for a group of pixels in a second direction in the predetermined unit area, the second direction being perpendicular to the first direction, the group of pixels including outer lines and inner lines;

selecting a larger one of the average pixel values from the outer lines, the selected outer average pixel value being defined as Th;

selecting a largest one of the average pixel values from the inner lines, the selected inner average pixel value being defined as Max;

comparing (Mx−Th) to a predetermined second threshold value to generate a second comparison result; and detecting an isolated portion in the predetermined unit area based upon the first comparison result and the second comparison result.

33. A method of detecting isolated pixels in a predetermined unit area, comprising the steps of:

comparing pixel values in a first pair of parallel edges in a first direction in the predetermined unit area to a first predetermined threshold value to generate a first comparison result;

comparing pixel values in a second pair of parallel edges in a second direction in the predetermined unit area to the first predetermined threshold value to generate a third comparison result;

determining an average pixel value for a group of pixels in a second direction in the predetermined unit area, the second direction being perpendicular to the first direction, the group of pixels including outer lines and inner lines;

selecting a larger one of the average pixel values from the outer lines, the selected outer average pixel value being defined as Th;

selecting a largest one of the average pixel values from the inner lines, the selected inner average pixel value being defined as Max;

omparing (Mx−Th) to a predetermined second threshold value to generate a second comparison result; and detecting an isolated portion in the predetermined unit area based upon the first comparison result, the second comparison result and the third comparison result.

* * * * *